US009117111B2

(12) United States Patent
Mori et al.

(10) Patent No.: US 9,117,111 B2
(45) Date of Patent: Aug. 25, 2015

(54) PATTERN PROCESSING APPARATUS AND METHOD, AND PROGRAM

(75) Inventors: Katsuhiko Mori, Kawasaki (JP); Masami Kato, Sagamihara (JP); Yoshinori Ito, Tokyo (JP); Takahisa Yamamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1057 days.

(21) Appl. No.: 12/963,568

(22) Filed: Dec. 8, 2010

(65) Prior Publication Data

US 2011/0081089 A1 Apr. 7, 2011

Related U.S. Application Data

(63) Continuation of application No. PCT/JP2010/060181, filed on Jun. 16, 2010.

(30) Foreign Application Priority Data

Jun. 16, 2009 (JP) ................................. 2009-143618
Jun. 15, 2010 (JP) ................................. 2010-136066

(51) Int. Cl.
  *G06K 9/68* (2006.01)
  *G06K 9/00* (2006.01)
(52) U.S. Cl.
  CPC .................................. *G06K 9/00281* (2013.01)
(58) Field of Classification Search
  CPC ................................................ G06K 9/00281
  USPC .................................. 382/190, 118, 218, 224
  See application file for complete search history.

(56) References Cited

U.S. PATENT DOCUMENTS 5,164,992 A * 11/1992 Turk et al. ..................... 382/118
7,039,233 B2 * 5/2006 Mori et al. ..................... 382/181
(Continued)

FOREIGN PATENT DOCUMENTS

JP H09-035198 A 2/1997
JP H11-53525 A 2/1999
(Continued)

OTHER PUBLICATIONS

Paul Viola, Michael Jones, "Rapid Object Detection using a Boosted Cascade of Simple Features", Conference on Computer Vision and Pattern Recognition 2001.

(Continued)

*Primary Examiner* — Samir Ahmed
(74) *Attorney, Agent, or Firm* — Canon U.S.A., Inc. IP Division

(57) ABSTRACT

Even when a local area is varied, degradation in recognition accuracy and detection accuracy is suppressed. To that end, a pattern processing apparatus includes a reference local area setting portion 1802 for setting a reference local area based on the detection result of a feature point by a face organ feature point detecting portion 101, a varied local area generating portion 1803 for generating a plurality of varied local area patterns by referring to an image area near the reference local area, a similarity calculating portion 106 for calculating similarities in the reference local areas and in the varied local area patterns between the input pattern and the registered pattern, a representative similarity calculating portion 107 for calculating representative similarity from among the similarities, and a classifying portion 109 for determining a class to which the input pattern belongs.

33 Claims, 30 Drawing Sheets

(56) References Cited

U.S. PATENT DOCUMENTS

| | | | |
|---|---|---|---|
| 7,577,297 B2 * | 8/2009 | Mori et al. ............. | 382/190 |
| 7,912,253 B2 * | 3/2011 | Suzuki et al. ........... | 382/118 |
| 2006/0115157 A1 * | 6/2006 | Mori et al. ............. | 382/190 |
| 2006/0204053 A1 * | 9/2006 | Mori et al. ............. | 382/118 |
| 2007/0098231 A1 | 5/2007 | Minato | |
| 2007/0242856 A1 | 10/2007 | Suzuki et al. | |
| 2009/0080711 A1 | 3/2009 | Yokoi | |
| 2009/0232365 A1 * | 9/2009 | Berthilsson et al. ..... | 382/118 |
| 2010/0239172 A1 * | 9/2010 | Akiyama ............... | 382/190 |

FOREIGN PATENT DOCUMENTS

| | | |
|---|---|---|
| JP | 2000-090191 A | 3/2000 |
| JP | 2000-311248 A | 11/2000 |
| JP | 2002-063567 A | 2/2002 |
| JP | 2002-203243 A | 7/2002 |
| JP | 2003-178304 A | 6/2003 |
| JP | 2005-004612 A | 1/2005 |
| JP | 2005-346425 A | 12/2005 |
| JP | 2006-004003 A | 1/2006 |
| JP | 2006-011978 A | 1/2006 |
| JP | 2006-235817 A | 9/2006 |
| JP | 2006-285944 A | 10/2006 |
| JP | 2007-128262 A | 5/2007 |
| JP | 2008-293073 A | 12/2008 |
| JP | 2009-053916 A | 3/2009 |
| JP | 2009-075868 A | 4/2009 |

OTHER PUBLICATIONS

P. S. Penev, J. J. Atick, "Local Feature Analysis: A general statistical theory for object representation", Network: Computation in Neural Systems 1996;7:477-500.

B. Moghaddam, W. Wahid, A. Pentland, "Beyond Eigenfaces: Probabilistic Matching for Face Recognition", International Conference on Automatic Face & Gesture Recognition (1998).

Kazuhiro Fukui, Osamu Yamaguchi, "Face Feature Point Extraction using Combination of Shape Extraction and Pattern Matching", The Journal of the Institute of Electronics, Information and Communication Engineers (D), vol. J80-D-2, No. 8, 2170-2177, 1997.

E. Murphy-Chutorian, M. M. Trivedi, "Head Pose Estimation in Computer Vision: A Survey", IEEE Transactions on Pattern Analysis and Machine Intelligence, vol. 31, No. 4, Apr. 2009.

A. B. Ashraf, S. Lucey, T. Chen, "Learning Patch Correspondences for Improved Viewpoint Invariant Face Recognition", Carnegie Mellon University, IEEE International Conference on Computer Vision and Pattern Recognition (CVPR), Jun. 2008.

* cited by examiner

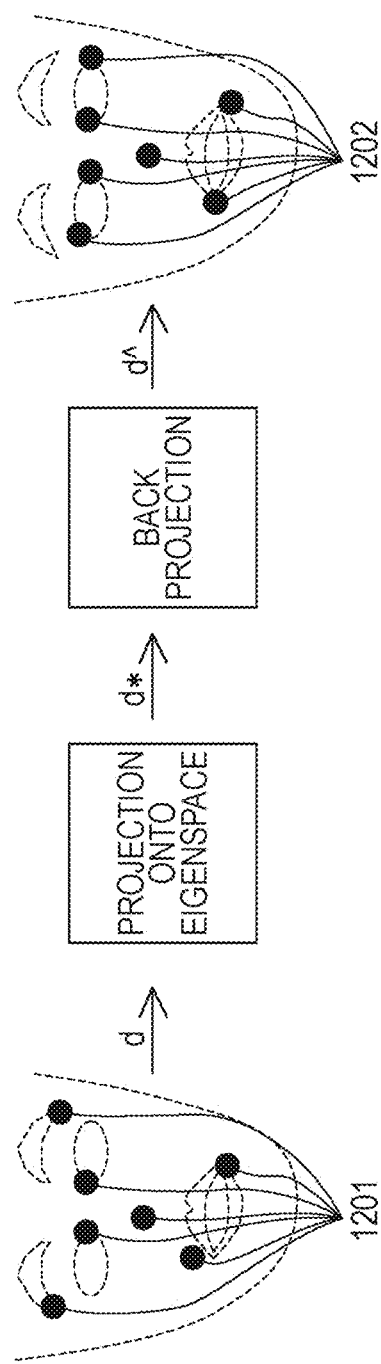

FIG. 23A
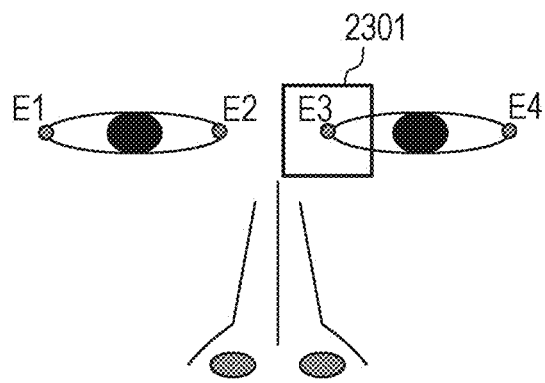
FIG. 23B
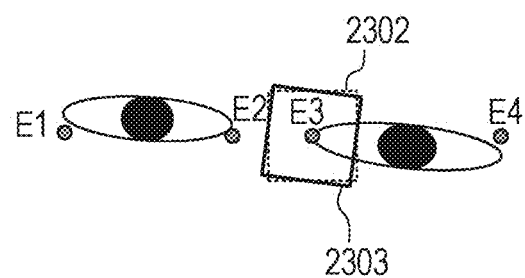
FIG. 23C
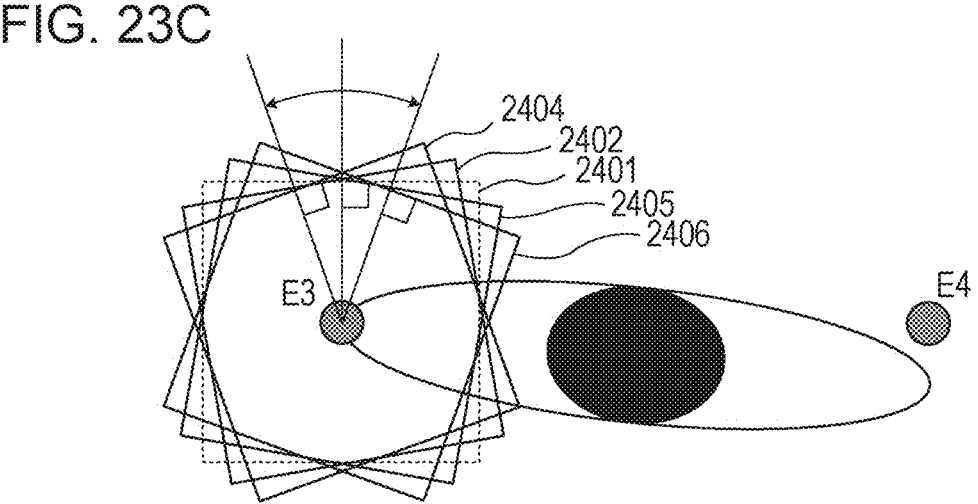

FIG. 24A
FIG. 24A
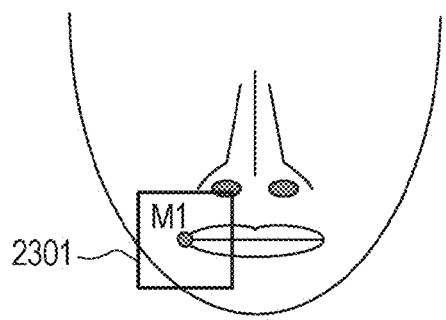
FIG. 24B
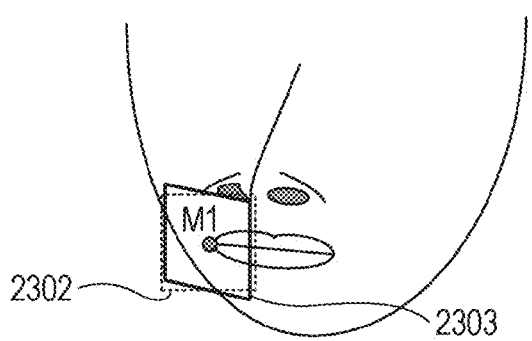
FIG. 24C
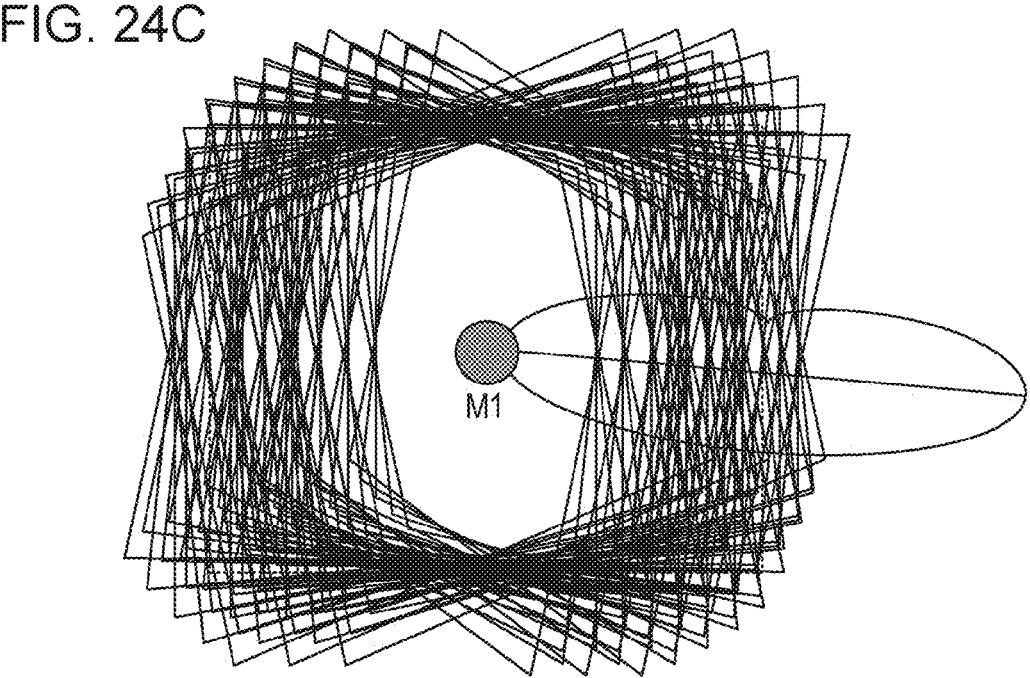

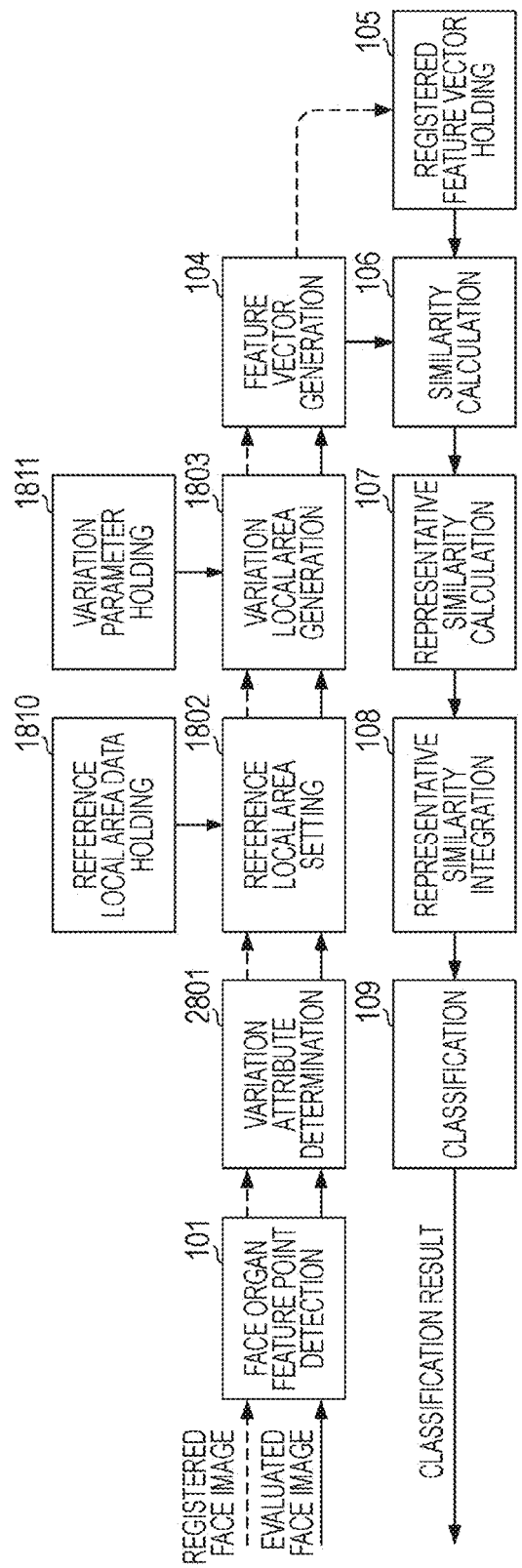

PATTERN PROCESSING APPARATUS AND METHOD, AND PROGRAM

This application is a Continuation of International Application No. PCT/JP2010/060181, filed Jun. 16, 2010, which claims the benefit of Japanese Patent Application No. 2009-143618, filed Jun. 16, 2009 and No. 2010-136066, filed Jun. 15, 2010, both of which are hereby incorporated by reference herein in their entirety.

TECHNICAL FIELD

The present invention relates to a pattern processing apparatus and method and a program, which are adapted for executing classification and detection of a pattern.

BACKGROUND ART

Recently, various devices with the function of detecting and recognizing a predetermined object in an image have been proposed. Regarding those devices, there is a demand for development of a technique capable of detecting and recognizing a target (such as a human face or a mechanical part) in an input image at a higher speed with higher accuracy.

In general, a process for recognizing a face in an image includes a detection process of detecting the face in the taken image, and a recognition process of specifying a person in a detected face area.

Many techniques for detecting a target, e.g., a human face in an input image, have been proposed in the past. For example, NPL 1 proposes a technique for detecting a face as an object at a high speed. This technique employs a plurality of weak classifiers, which are connected in a cascaded way, to determine whether a predetermined area cut out from the input image represents the face.

Many recognition techniques are also proposed. For example, PTL 1 discloses a technique of generating, from a large number of face images, eigenvectors representing faces in advance, projecting a registered face image and an input face image onto the eigenvectors, and measuring a distance between respective obtained projection vectors, thereby specifying personal ID. The disclosed technique is called "Eigenface". With respect to the Eigenface, it is said that accuracy is reduced due to variations caused by a face orientation, illumination, etc. NPL 2 discloses a technique, called "Local Feature Analysis (LFA)", of generating an eigenvector for each local area of a face, and performing face recognition by using respective projection vectors of a registered image and an input image for each local area. Further, PTL 3 discloses a recognition technique using a brightness value distribution that is obtained by adding and projecting brightness values in a predetermined direction for each of local areas. In addition, PTL 4 discloses a technique of separately obtaining a face orientation, occlusion, etc. and assigning a weight to each local area based on the obtained values.

NPL 3 performs face recognition by using a classifier that receives, as an input, a differential image between a registered face image and an input face image, and that classifies a face into an intra-person class when both the images represent the same person, and into an extra-person class when both the images represent different persons. Further, PTL 2 discloses a classification technique using support vector machines (SVM) on the basis of the technique disclosed in NPL 3. In the PTL 2, a similarity vector is generated from a feature value, which is obtained by a Gabor filter, at each of plural points in the registered face image and the input face image, and classification into the intra-person class and the extra-person class is made by using the SVM.

In the face recognition on the basis of the local area, feature points of face organs, such as the outer corner of the eye, the inner corner of the eye, and the end points of the mouth, are used to set the local areas. Many techniques for detecting those feature points are also proposed. For example, NPL 4 discloses a technique of utilizing a circle separation filter and a partial space.

Further, NPL 5 discloses various techniques for determining a face orientation attribute in an input face image.

NPL 6 discloses a technique for realizing an improvement of an identification rate by deforming the local area in accordance with the face orientation attribute such that similarity to the same person is increased.

CITATION LIST

Patent Literature

PTL 1: U.S. Pat. No. 5,164,992
PTL 2: Japanese Patent Laid-Open No. 2006-004003
PTL 3: Japanese Patent Laid-Open No. 2003-178304
PTL 4: Japanese Patent Laid-Open No. 2007-128262

Non Patent Literature

NPL 1: Paul Viola, Michael Jones, "Rapid Object Detection using a Boosted Cascade of Simple Features", CONFERENCE ON COMPUTER VISION AND PATTERN RECOGNITION 2001

NPL 2: P. S. Penev, J. J. Atick, "Local Feature Analysis: A general statistical theory for object representation", Network: Computation in Neural Systems 1996; 7:477-500

NPL 3: B. Moghaddam, W. Wahid, A. Pentland, "Beyond Eigenfaces: Probabilistic Matching for Face Recognition", International Conference on Automatic Face & Gesture Recognition (1998)

NPL 4: Kazuhiro Fukui, Osamu Yamaguchi, "Face Feature Point Extraction using Combination of Shape Extraction and Pattern Matching", The Journal of the Institute of Electronics, Information and Communication Engineers (D), Vol. J80-D-2, No. 8, 2170-2177, 1997

NPL 5: E. Murphy-Chutorian, M. M. Trivedi, "Head Pose Estimation in Computer Vision: A Survey", IEEE TRANSACTIONS ON PATTERN ANALYSIS AND MACHINE INTELLIGENCE, VOL. 31, NO. 4, APRIL 2009.

NPL 6: A. B. Ashraf, S. Lucey, T. Chen, "Learning Patch Correspondences for Improved Viewpoint Invariant Face Recognition", Carnegie Mellon University, IEEE International Conference on Computer Vision and Pattern Recognition (CVPR), June, 2008.

In view of the situation described above as the background art, a further improvement of recognition accuracy is demanded. In the recognition process on the basis of the location area, comparison is to be made between corresponding local areas in the registered image and the input image, but detection of the feature point, which is used to decide the local area, is apt to cause errors due to variations in illumination and in face orientation. Further, even when no errors are caused in the detection of the feature point, the shape of the local area is itself deformed due to variations in face orientation and expressions. This leads to the problem that the positions of the local areas are eventually deviated from each other when the comparison is performed between the local areas in the recognition process. Another problem is that because the orientation, size, and shape variations (e.g., expressions) of a target object (e.g., a face) are not always matched between the registered image and the input image, an evaluation value obtained using those local areas may become low even when objects in the registered image and the input image are the same person.

Still another problem is that, in the process of detecting a particular object, a detection rate is reduced when the shape of a part of the target object varies.

The present invention has been accomplished in consideration of the problems described above, and an objective of the present invention is to suppress degradation in recognition accuracy even when an error is caused in the detection of the feature point.

Another objective of the present invention is to provide a good detection result even when the shape of a part of the target object varies.

SUMMARY OF INVENTION

According to the present invention, there is provided a pattern processing apparatus for comparing an input pattern and a registered pattern in respective local areas, thereby determining a class to which the input pattern belongs, the pattern processing apparatus comprising a local area setting unit configured to set the local areas in the input pattern and the registered pattern, a varied local area generating unit configured to generate a plurality of varied local area patterns based on the local area set in at least one of the input pattern and the registered pattern, a similarity calculating unit configured to calculate a plurality of similarities for combinations of a pattern of the local area set in the input pattern or the plurality of varied local area patterns generated based on the input-pattern local area and a pattern of the local area set in the registered pattern or the plurality of varied local area patterns generated based on the registered-pattern local area, the local area in the registered pattern corresponding to the local area in the input pattern, a representative similarity calculating unit configured to calculate, per local area, representative similarity in terms of similarity of the local area set in the registered pattern with respect to the local area in the input pattern from among the plurality of similarities for the combinations of the pattern of the local area set in the input pattern or the plurality of varied local area patterns generated based on the input-pattern local area and the pattern of the local area set in the registered pattern or the plurality of varied local area patterns generated based on the registered-pattern local area, and a classifying unit configured to determine, based on the representative similarity calculated by the representative similarity calculating unit, a class to which the input pattern belongs.

According to another embodiment of the present invention, there is provided a pattern processing apparatus for detecting a detection target present in an input pattern based on detection results of local area patterns corresponding respectively to a plurality of local areas in a pattern of the detection target, the pattern processing apparatus comprising a reference local area pattern holding unit configured to store reference local area patterns serving respective references for the local area patterns, a varied local area generating unit for generating a plurality of varied local area patterns based on at least one of the reference local area patterns, a local area pattern detecting unit configured to detect the reference local area patterns or the plurality of varied local area patterns from the input pattern, and a target detecting unit configured to detect the detection target in the input pattern by integrating the detection results of the plurality of local area patterns, which are obtained by the local area pattern detecting unit.

Further features of the present invention will become apparent from the following description of exemplary embodiments with reference to the attached drawings.

BRIEF DESCRIPTION OF DRAWINGS

FIG. 15 illustrates an outline of processing executed in step S1102.

FIGS. 23A to 23C illustrate another example of a part of the registered face image and a part of the evaluated face image.

FIGS. 24A to 24C illustrate one example of a part of the registered face image and a part of the evaluated face image.

FIG. 26 is a block diagram illustrating still another example of the functional configuration of the pattern classifier.

DESCRIPTION OF EMBODIMENTS

Embodiments of the present invention will be described below with reference to the drawings.

<First Embodiment>

In this embodiment, a process of receiving a face image as an input pattern and comparing the input face image and a registered face image with each other, to thereby determine whose face is a face in the input face image, i.e., a process of specifying personal ID of the input face image, is described as an example of pattern processing.

In the following description, a process of executing processing necessary for recognition on the registered image and holding obtained data (feature vector) is called a "registration process". Also, a process of executing processing necessary for recognition on the input image to obtain a feature vector in a likewise manner, and deducing and determining similarity between the obtained feature vector and the feature vector having been generated and held in the registration process is called an "evaluation process".

Figure 1:
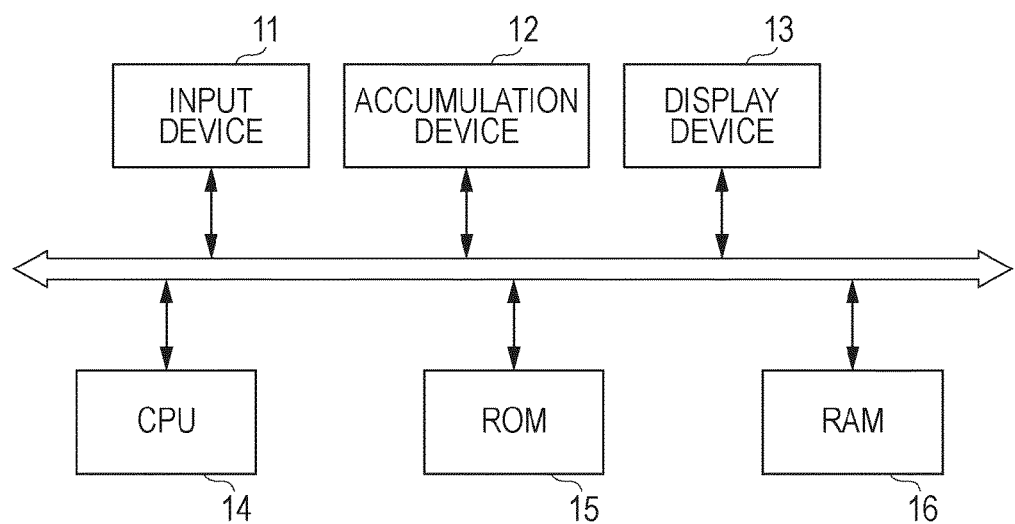
FIG. 1 is a block diagram illustrating one example of hardware configuration of a pattern classifier.

FIG. 1 is a block diagram illustrating one example of hardware configuration of a pattern classifier. In FIG. 1, an input device 11 is constituted by a keyboard or a pointing device. A user manipulates the input device to input data and to instruct operations. An accumulation device 12 as one example of a storage device accumulates data, and it is, e.g., a hard disk. A display device 13 displays the data, etc. accumulated in the accumulation device 12, for example, and it is, e.g., a CRT or a liquid crystal.

A CPU 14 takes part in all processing executed by the above-described devices. A ROM 15 and a RAM 16 provide a memory and a work area for storing data necessary for the processing. All or part of functions described later and each of steps in flowcharts described later are realized with the CPU 14 that reads a program from the ROM 15 and that executes processing in accordance with the program.

The pattern classifier may further include a read portion for reading an image from an image pickup apparatus that is constituted by, e.g., a known CCD sensor device.

Figure 2:
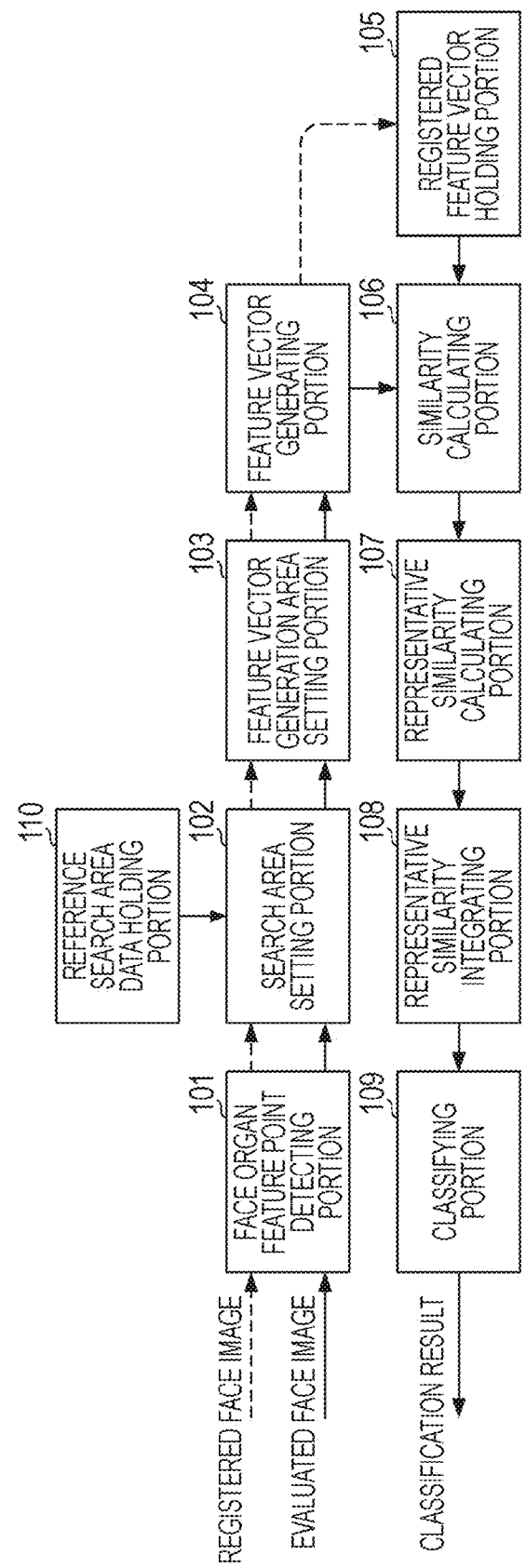
FIG. 2 is a block diagram illustrating one example of functional configuration, etc. of the pattern classifier.

FIG. 2 is a block diagram illustrating one example of functional configuration, etc. of the pattern classifier.

A face organ feature point detecting portion 101 detects feature points of face organs, such as the outer corner of the eye, the inner corner of the eye, and the end points of the mouth, in the input face image. A manner of detecting the feature points in the face organ feature point detecting portion 101 will be described later.

A search area setting portion 102 sets, in a pattern of the input face image, a search area for setting a local area based on an output of the face organ feature point detecting portion 101. A manner of setting the search area in the search area setting portion 102 will be described later.

A feature vector generation area setting portion 103 sets, in the search area set by the search area setting portion 102, a feature vector generation area for generating a feature vector (called also "local area setting"). A manner of setting the feature vector generation area in the feature vector generation area setting portion 103 will be described later.

A feature vector generating portion 104 generates, from the feature vector generation area set by the feature vector generation area setting portion 103, the feature vector of the relevant area. A manner of generating the feature vector in the feature vector generating portion 104 will be described later.

A registered feature vector holding portion 105 holds, in the registration process, the feature vector generated in the feature vector generating portion 104.

A similarity calculating portion 106 calculates, in the evaluation process, similarity between the feature vector of a certain local area in the input face image, which has been generated in the feature vector generating portion 104, and the feature vector of a certain local area in the registered face image, which is held in the registered feature vector holding portion 105. A manner of calculating the similarity in the similarity calculating portion 106 will be described later.

A representative similarity calculating portion 107 calculates representative similarity in the relevant search area by using the similarity that has been calculated by the similarity calculating portion 106 for each of the local areas within the search area. A manner of calculating the representative similarity in the representative similarity calculating portion 107 will be described later.

A representative similarity integrating portion 108 integrates the representative similarities of the search areas, which have been calculated by the representative similarity calculating portion 107, thereby obtaining an evaluation value for the input image and the registered image. A manner of integrating the representative similarities in the representative similarity integrating portion 108 will be described later.

A classifying portion 109 determines a class, which corresponds to a person in the input face image, based on the evaluation value for the input image, which has been obtained by the representative similarity integrating portion 108 with respect to each of all the registered images.

A reference search area data holding portion 110 holds data regarding a reference search area used in the search area setting portion 102.

In FIG. 2, broken lines indicate the registration process, and solid lines indicate the evaluation process.

Figure 3:
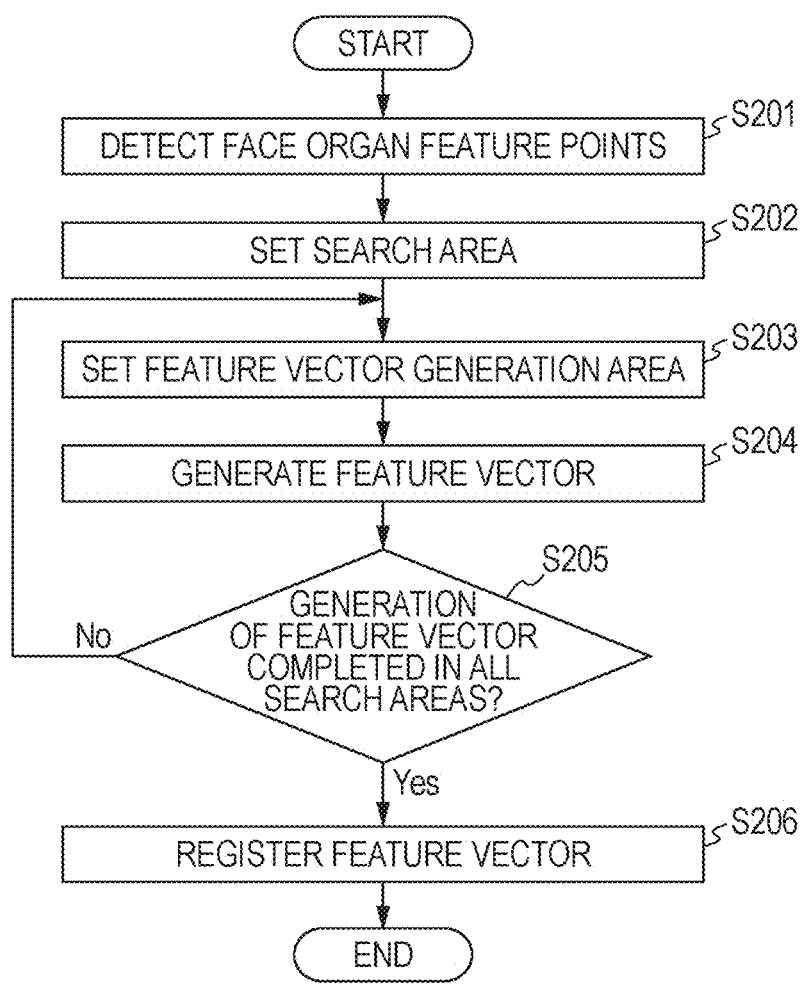
FIG. 3 is a flowchart illustrating one example of a registration process.

The registration process is first described. FIG. 3 is a flowchart illustrating one example of a registration process procedure.

Figure 4:
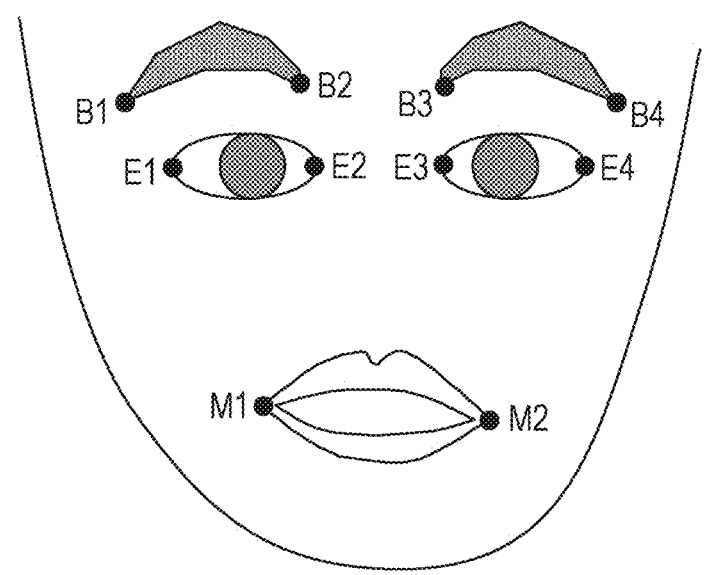
FIG. 4 illustrates one example of feature points detected.

In step S201, the face organ feature point detecting portion 101 detects the face organ feature points for the registered face image. FIG. 4 illustrates one example of the feature points detected in step S201. In FIG. 4, E1 and E4 denote the outer corners of the eye, E2 and E3 denote the inner corners of the eye, B1, B2, B3 and B4 denote the ends of the eyebrows, and M1 and M2 denote the end points of the mouth.

The face organ feature point detecting portion 101 can use the known manner in detecting the face organ feature points. For example, the face organ feature point detecting portion 101 can use a manner of detecting the feature points by repeating processes of hierarchically detecting local features and integrating the detection results in one hierarchy so as to detect local features in a next hierarchy. More specifically, the face organ feature point detecting portion 101 first detects primary features, i.e., primitive features, and then detects secondary features by using the detection results (detection levels and positional relationships) of the primary features. Further, the face organ feature-point detecting portion 101 detects tertiary features by using the detection results of the secondary features. In addition, the face organ feature point detecting portion 101 successively detects higher-order features in a similar way.

Figure 5:
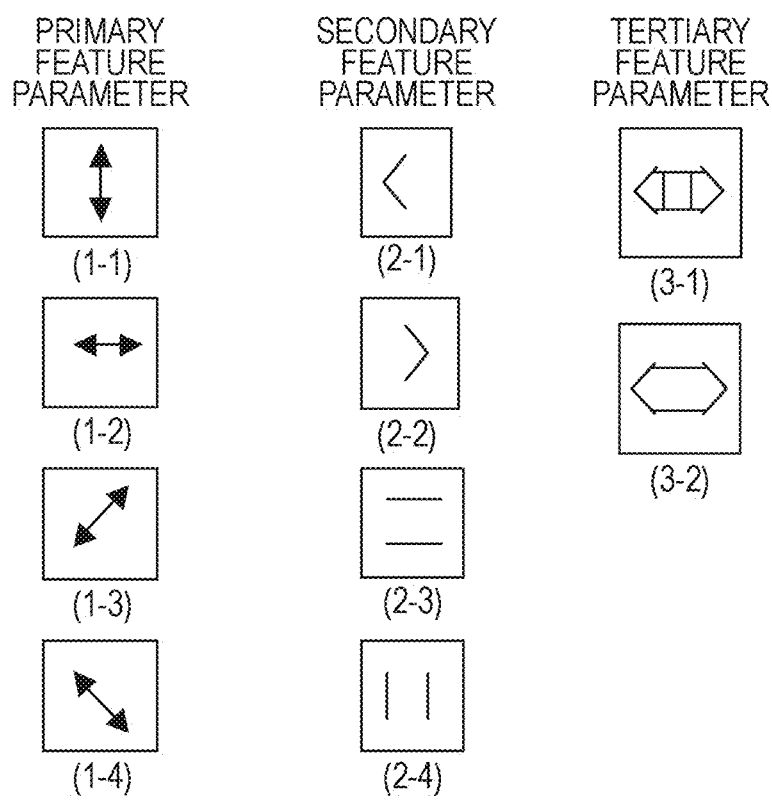
FIG. 5 illustrates one example of primary features to be detected.

FIG. 5 illustrates one example of the primary features to be detected. The face organ feature point detecting portion 101 first detects the primary features, such as a vertical feature (1-1), a horizontal feature (1-2), a rightward ascending slant feature (1-3), and a rightward descending slant feature (1-4).

Herein, the vertical feature (1-1) represent a vertical edge segment (this is similarly applied to the other features). The detection results of the features are output per feature as an image of the detection result having the same size as the input image. Thus, in the example of FIG. 5, four types of the detection result images are obtained and, by looking at respective values at positions of the features in the detection result images, the face organ feature point detecting portion 101 can determine whether each of the features is present at the relevant position in the input image.

For a rightward open V-shaped feature (2-1) as one secondary feature, the face organ feature point detecting portion 101 detects it from both the rightward ascending slant feature and the rightward descending slant feature. For a leftward open V-shaped feature (2-2) as another secondary feature, the face organ feature point detecting portion 101 detects it from both the leftward descending slant feature and the rightward ascending slant feature. For a horizontal parallel line feature (2-3) as still another secondary feature, the face organ feature point detecting portion 101 detects it from the horizontal feature. For a vertical parallel line feature (2-4) as still another secondary feature, the face organ feature point detecting portion 101 detects it from the vertical feature.

Further, for an eye feature (3-1) as one tertiary feature, the face organ feature point detecting portion 101 detects it from the rightward open V-shaped feature, the leftward open V-shaped feature, the horizontal parallel line feature, and the vertical parallel line feature. For a mouth feature (3-2) as another tertiary feature, the face organ feature point detecting portion 101 detects it from the rightward open V-shaped feature, the leftward open V-shaped feature, and the horizontal parallel line feature.

The above-described detection method can also be realized with a neural network that executes image recognition through a parallel hierarchical process. More specifically, that detection method can be realized with Convolutional Neural Networks described in M. Matsugu, K. Mori, et. al, "Convolutional Spiking Neural Network Model for Robust Face Detection", 2002, International Conference on Neural Information Processing (ICONIP02).

Figure 6:
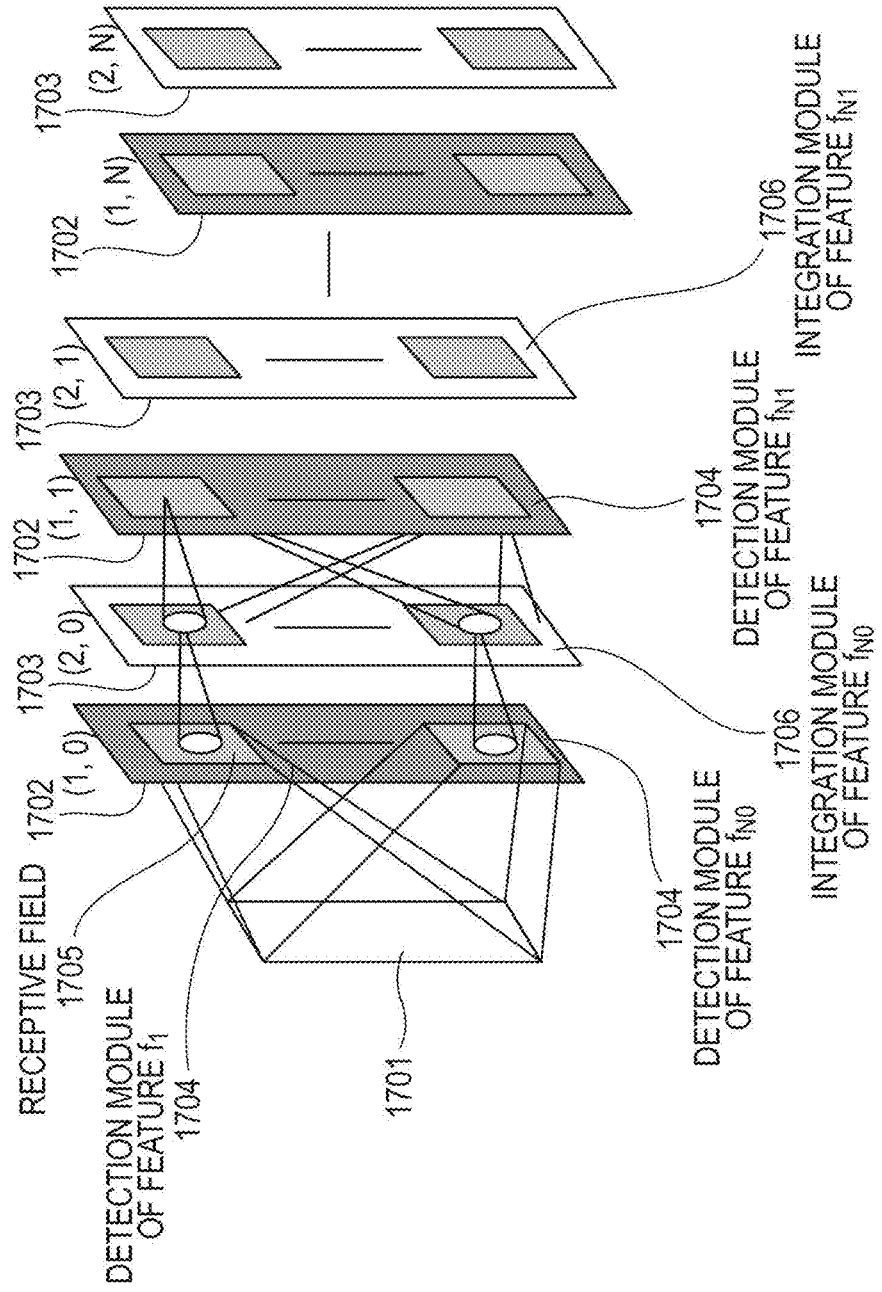
FIG. 6 is an illustration to explain details of the processing in a neural network.

Processing details of the neural network will be described with reference to FIG. 6. FIG. 6 is an illustration to explain details of the processing in the neural network. The neural network of FIG. 6 hierarchically handles, in local areas of input data, information regarding recognition (detection) of, e.g., a target or a geometrical feature. A basic structure of the neural network is the so-called "Convolutional Network Structure" (LeCun, Y. and Bengio, Y., 1995, "Convolutional Networks for Images Speech, and Time Series" in Handbook of Brain Theory and Neural Networks (M. Arbib. Ed.), MIT Press, pp. 255-258). In a final layer (uppermost level layer), it is possible to obtain a determination result as to the presence or absence of an object to be detected and, if present, to obtain positional information of the object in terms of input data.

A data input layer 1701 receives image data as an input. A first feature detection layer 1702 (1,0) detects, at the same location in each of local areas having centers at various positions over an entire screen, local low-order features of an image pattern input from the data input layer 1701 in the same number as plural feature categories at plural scale levels or resolutions. The low-order features may include not only geometrical features such as a component in a particular direction and a component of particular spatial frequency, but also a color component feature. Further, local areas having centers at predetermined sampling points over the entire screen may be used instead of the local areas having the centers at various positions over the entire screen.

A feature integration layer 1703 (2,0) has a predetermined receptive field structure (hereinafter the term "receptive field" implies a coupling range with respect to an output device in a just preceding layer, and the term "receptive field structure" implies a distribution of coupling weight therein). The feature integration layer 1703 (2,0) performs integration (i.e., calculation such as sub-sampling with local averaging, maximum output detection or the like) of outputs of plural neuron devices within the same receptive field, which are received from the feature detection layer 1702 (1,0). This integration process has a role of accommodating a positional deviation, deformation, etc. by spatially blurring the outputs from the feature detection layer 1702 (1,0). Additionally, the receptive fields of neurons in the feature integration layer have a structure common to the neurons in the same layer.

Each of succeeding feature detection layers 1702 ((1,1), (1,2), . . . , (1,M)) detects a plurality of different features in respective feature detection modules. Each of succeeding feature integration layers 1703 ((2,1), (2,2), . . . , (2,M)) integrates the detection results regarding the plural features, which are obtained from the feature detection layer in a preceding stage. The feature detection layers 1702 ((1,1), (1,2), . . . , (1,M)) are each coupled (wired) so as to receive an output of a cell element of the feature integration layer in the preceding stage, which belongs to the same channel. In the sub-sampling, i.e., in the processing executed by the feature integration layer, averaging or the like is performed on outputs from local areas (i.e., local receptive fields of neurons in the feature integration layer), which are obtained from feature detection cell groups in the same feature category.

The features illustrated in FIG. 5 can be detected by setting the receptive field structures, which are used for the detection in each of the feature detection layers illustrated in FIG. 6, to be adapted for the relevant features.

Figure 7:
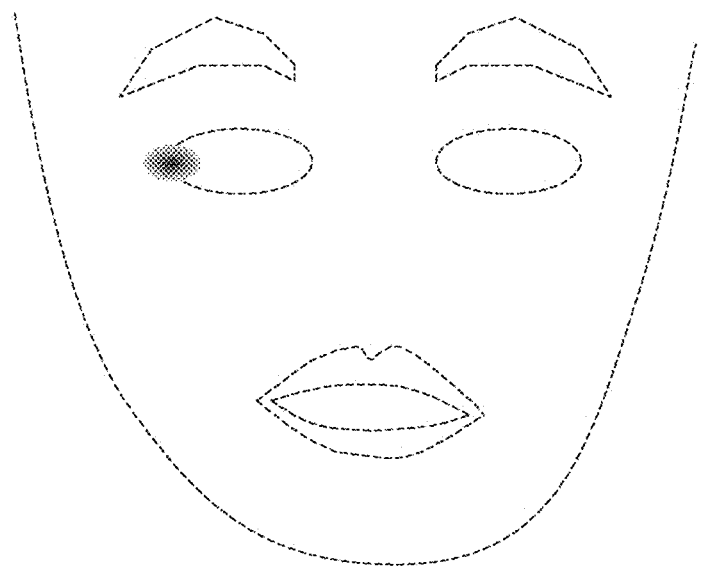
FIG. 7 illustrates one example of an output distribution of results of detecting the outer corner of the eye.

Because such a technique calculates summation of products using previously prepared weight coefficients over a predetermined range, the results of the detection processes for the target feature points, which have high output values, are distributed within a certain range. An example of an output distribution of the results of detecting the outer corner E1 of the eye is illustrated in FIG. 7. Thus, FIG. 7 illustrates one example of an output distribution of the results of detecting the outer corner E1 of the eye. In the example of FIG. 7, the detection result is indicated in a deeper black color as the detection result has a higher output value. The value of the detection result is provided as summation of products of the weight coefficients and the integrated detection results for the preceding layer. A higher value of the detection result implies that there is a feature closer to the desired feature. In other words, such a distribution can be regarded as reflecting an existence probability distribution of the desired feature. Accordingly, the face organ feature point detecting portion 101 sets, as a position of the feature point, the position providing a maximum value in the distribution or the position of the barycenter thereof.

Returning to the explanation of FIG. 3, in step S202, the search area setting portion 102 sets a search area by using each of the feature points obtained in step S201 and the distribution reflecting the existence probability distribution resulted when each feature point has been obtained (i.e., information regarding an estimation error occurred when each feature point has been obtained). In the registration process, the search area setting portion 102 sets, as the search area, the reference local area set using the data of the reference search area, which is held in the reference local area data holding portion 110.

A manner of setting the reference search area will be described with reference to FIG. 8. FIG. 8 is an illustration to explain the manner of setting the reference search area.

Figure 8A:
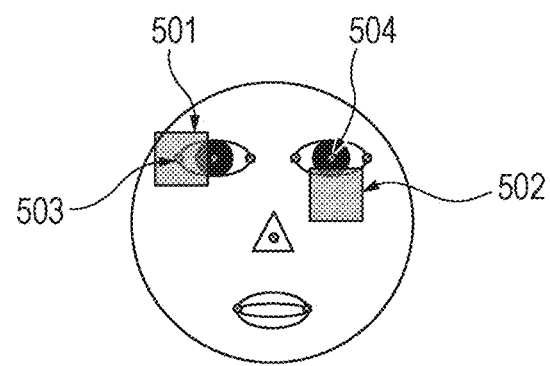
FIGS. 8A and 8B are each an illustration to explain a manner of setting a reference search area.
Figure 8B:
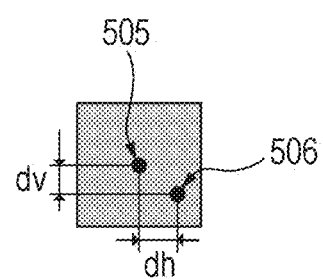

The search area setting portion 102 sets the reference local area on the basis of each of the feature points that have been detected in step S201. FIG. 8 illustrates the reference search areas and the feature points. In FIG. 8A, circular points denoted by feature points 503 and 504 represent the feature points detected in step S201, and rectangular areas 501 and 502 represent the reference search areas. As illustrated in FIG. 8B, the position of each of those reference search areas is decided by the feature point and a displacement from it. Also, as illustrated in FIG. 8B, the displacement represents a relative position between a center 505 of the reference search area and the feature point 506, and it is given by an amount $d_h$ of displacement in the horizontal direction of the face and an amount $d_v$ of displacement in the vertical direction of the face. The search area setting portion 102 can decide respective positions of plural reference local areas by setting those amounts of displacement to various values. For example, the reference search area 501 in FIG. 8A is set by the displacement from the feature point 503, and the reference search area 502 is set by the displacement from the feature point 504. The amount of displacement and the size of the reference local area are held in the reference search area data holding portion 110. Those values may be decided in advance such that the reference search areas are present in a balanced way, or such that the reference search areas are positioned with desired accuracy by using a large number of learning data, i.e., by using the results and the recognition accuracies obtained when the positions and the sizes of the reference search areas have been changed.

Returning to the explanation of FIG. 3, in step S203, the feature vector generation area setting portion 103 sets a feature vector generation area from the search area that has been set in step S202. As described above, because the search area has the same position and the same size as those of the local area used for the recognition, the feature vector generation area is the same as the search area. Further, because in FIG. 8 the reference local area is indicated as a range where the local area is entirely moved, the search area=the local area is held. When the search area is indicated as a range where a center point of the local area is moved, as illustrated in FIG. 13 described later, the search area in the registration process is provided as only one point that is aligned with a center point of the local area.

In step S204, the feature vector generating portion 104 generates the feature vector from the feature vector generation area that has been set in step S203. The feature vector is not limited to a particular one so long as it represents a feature value obtained from the relevant area. For example, the feature vector generating portion 104 may use, as one-dimensional vector, brightness values of all pixels in the relevant area. Alternatively, the feature vector generating portion 104 may generate, as the feature vector, a projection vector resulted from projecting a one-dimensional vector, which is obtained from the brightness values of all the pixels in the relevant area, onto the preset eigenspace in a similar way to the "Eigen Face" described in the Background Art.

In step S205, the feature vector generating portion 104 determines whether the feature vectors are obtained in all the search areas, i.e., all the reference search areas, which have been set in step 102. If the feature vectors are obtained in all the search areas, the feature vector generating portion 104 shifts the processing to a feature vector registration step S206, and if not yet obtained, it shifts the processing to step S103.

In step S206, the feature vector generating portion 104 holds, as registered feature vectors for the relevant registered image, the feature vectors obtained in all the search areas, in the registered feature vector holding portion 105. Stated another way, the feature vector generating portion 104 holds, in the registered feature vector holding portion 105, indexes indicating the registered images, e.g., image numbers, and the registered feature vectors, which are to be registered, in a correlated way.

The registration process for one registered face image is thus completed. When there are plural registered images, the above-described processing is repeated.

Figure 9:
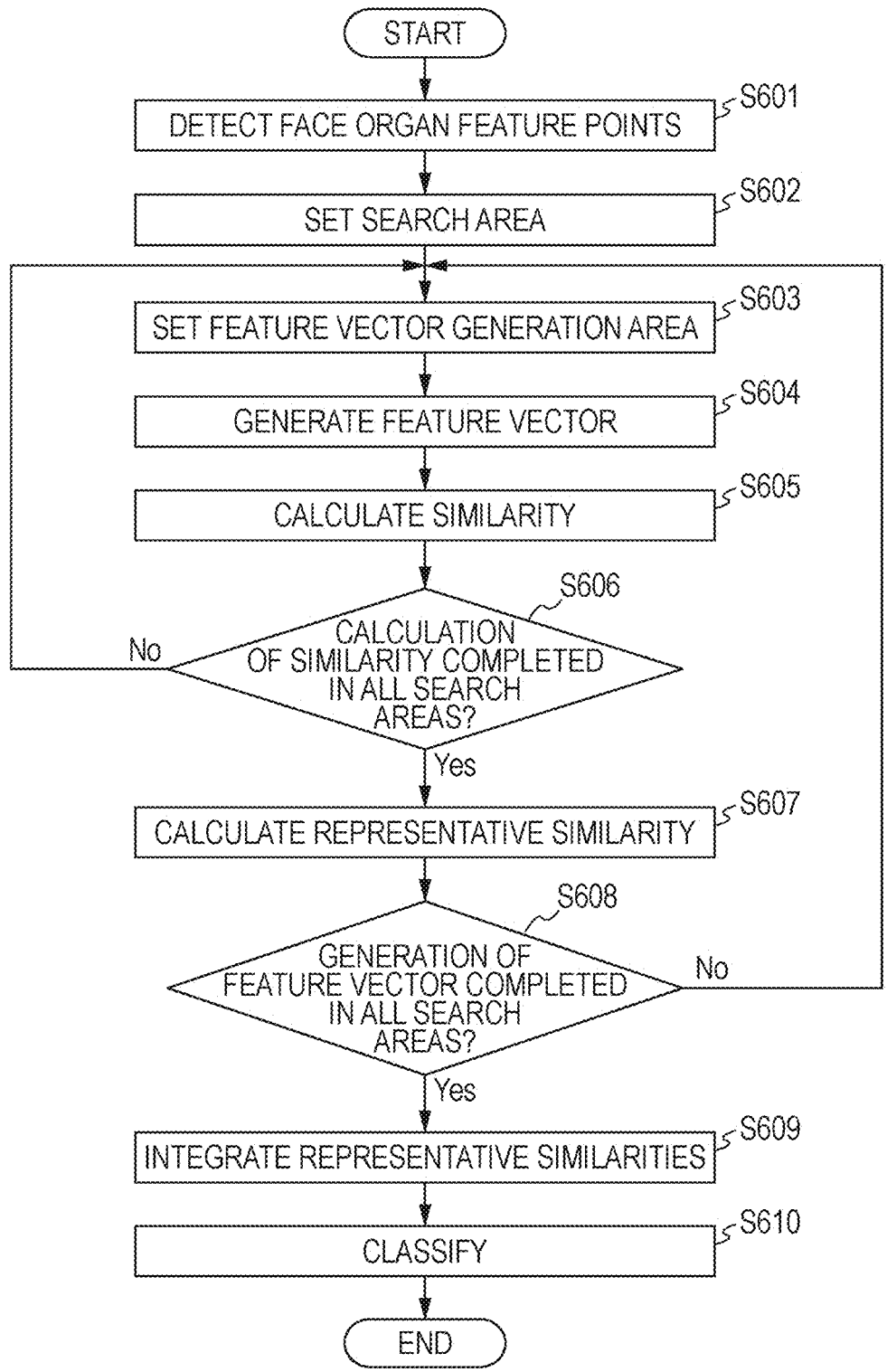
FIG. 9 is a flowchart illustrating one example of an evaluation process.

Next, the evaluation process is described. FIG. 9 is a flowchart illustrating one example of the evaluation process.

In step S601, the face organ feature point detecting portion 101 executes similar processing to that in the registration process.

In step S602, the search area setting portion 102 sets, as in the registration process, the search area by using each of the feature points detected in step S601 and the probability distribution resulted when each feature point has been detected. However, the search area to be set differs from that in the registration process. The difference in the search area is described below.

Figure 10:
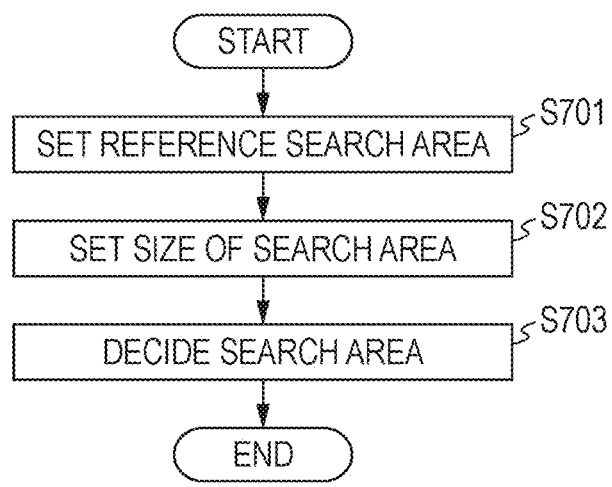
FIG. 10 is a flowchart illustrating one example of a process of setting a search area in the evaluation process.

FIG. 10 is a flowchart illustrating one example of the process of setting the search area in the evaluation process.

In step S701, the search area setting portion 102 sets, as in the registration process, the reference search area by using each of the feature points detected in step S601 and the data of the reference search area, which is held in the reference search area data holding portion 110. Here, the reference search area is provided as one point that is aligned with the center point of the local area. (Namely, the size of the reference search area is 1×1).

In step S702, the search area setting portion 102 determines the size of the search area by using the existence probability distribution of the feature point resulted when the feature point has been detected in step S601. A manner of determining the size will be described below.

In step S703, the search area setting portion 102 changes the size of the reference search area set in step S701 to the size determined in step S702, and then sets the changed area as the search area.

The manner of setting the size of the search area in step S702 is described below.

Figure 11A:
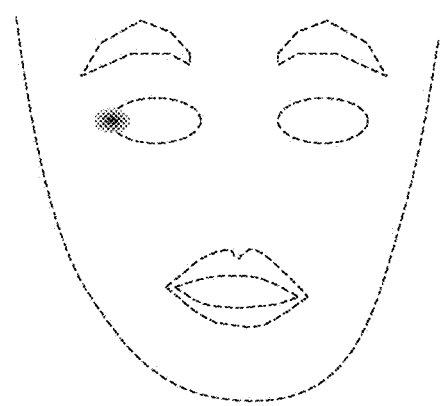
FIGS. 11A and 11B are each an illustration to explain an error in detection of the feature point.
Figure 11B:
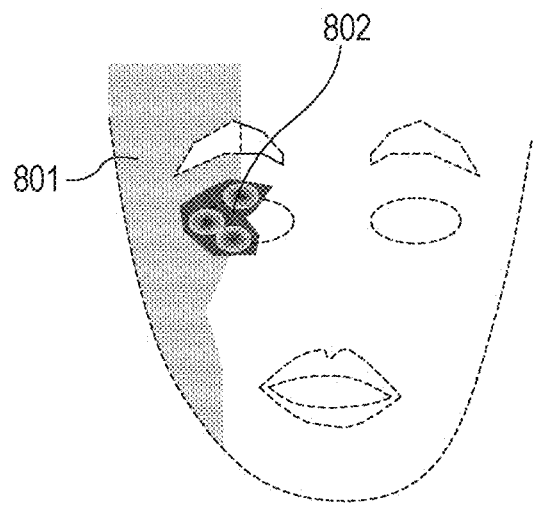

As described above in the process of detecting the face organ features in the registration process, the distribution of the values of the feature point detection results can be regarded as the existence probability distribution of the relevant feature. Thus, if a variance of that distribution is small, the existence position of the feature point can be restricted. Conversely, if the variance is large, it is difficult to restrict the existence position of the feature point. Assuming the case of detecting the outer corner E1 of the eye in FIG. 4, for example, when the image is taken under good illumination conditions, the result of detecting the feature of the outer corner of the eye is distributed near the outer corner of the eye with a small variance as illustrated in FIG. 11A. However, when a shade 801 is generated near the eye depending on, e.g., incoming light as illustrated in FIG. 11B, erroneous detection may occur at points where the shade intersects the contour of the eye, in addition to detection of the true outer corner of the eye. In the latter case, the detection result is provided as a relatively wide distribution 802 including a plurality of peaks. When the feature point is detected based on the position of a maximum value of the distribution or the barycenter thereof as described above in the registration process, the feature point is provided by the substantially correct position under the situation of FIG. 11A, but it may be provided by a erroneous position under the situation of FIG. 11B. For example, when the position of the feature point is provided as the barycenter of the distribution, it is substantially the same as the position of the outer corner of the eye in FIG. 11A. In FIG. 11B, however, the barycenter of the distribution is positioned at the inner side of the eye than the outer corner of the eye, and an error is caused with respect to the correct position of the outer corner of the eye. If the evaluation process is executed only in the reference local area based on such a detected position of the feature point, this implies that similarity is calculated in an area not corresponding to the correct position of the feature point and that recognition accuracy is reduced. For that reason, in this embodiment, the search area is set in accordance with the distribution of the values of the feature point detection results, and a plurality of local areas used for calculating the similarity are set from the set search area. Further, representative similarity in the relevant search area is calculated by using the results of calculating the similarity for each of the local areas.

Figure 12:
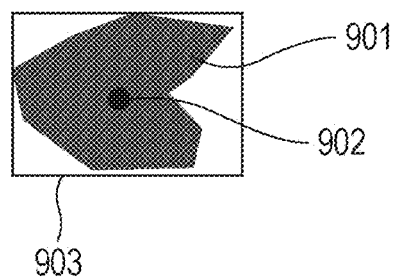
FIG. 12 illustrates a manner of setting the search area.

A manner of setting the search area in accordance with the distribution of the values of the feature point detection results will be described below. FIG. 12 illustrates the manner of setting the search area in accordance with the distribution of the values of the feature point detection results. In FIG. 12, numeral 901 denotes a feature point position candidate area that is obtained by binarizing the distribution of the output values of the detection results at a certain threshold. Numeral 902 denotes the position of the feature point detected in step S601. Further, numeral 903 denotes a rectangle circumscribing the feature point position candidate area. As described above, the reference local area is set based on the position of the feature point in both the registration process and the evaluation process. Accordingly, if an error is caused in the position of the feature point which serves as a reference, there is a possibility that the positions of the local areas used when calculating the similarity are deviated from each other between the registered face image and the evaluated face image and those positions do not correspond to each other. Because such a deviation is attributable to the detected position of the feature point, the influence of an error can be suppressed by calculating the similarity in the area falling within a range where there is a possibility that the detected position of the feature point may be incorrect.

For that reason, the search area setting portion 102 sets the size of the search area by using an area defined by the feature point position candidate area 901. More specifically, the search area setting portion 102 obtains the rectangle 903 circumscribing the feature point position candidate area 901 and sets the size of the circumscribing rectangle 903 as the size of the search area. This processing corresponds to that of step S702. Further, the search area setting portion 102 aligns the center of the reference local area set in step S701 with the position 902 of the feature point and decides, as the search area, an area having the same size as the search area set in step S702. Instead of setting the rectangular search area, the search area setting portion 102 may set, as the search area, the range defined by the feature point position candidate area 901 after aligning the center of the reference local area with the position 902 of the feature point. Such processing corresponds to that in step S703.

Figure 13A:
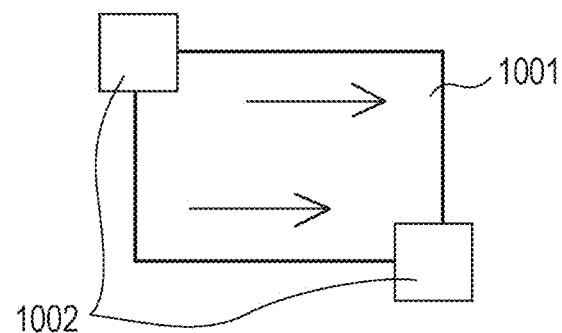
FIGS. 13A and 13B illustrate setting of a feature vector generation area.
Figure 13B:
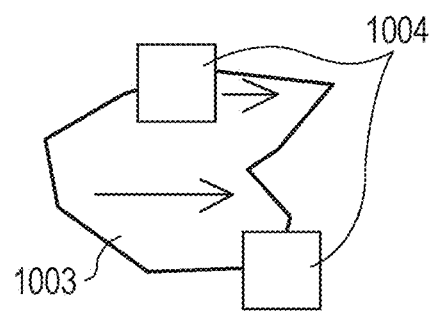

Returning to the explanation of FIG. 9, in step S603, the feature vector generation area setting portion 103 sets the feature vector generation area from the search area. FIGS. 13A and 13B illustrates the setting of the feature vector generation area. In FIG. 13A, numeral 1001 denotes the search area, and 1002 denotes the feature vector generation area. The feature vector generation area 1002 is selected one by one in turn from the search area 1001. Numeral 1003 in FIG. 13B represents the case where the feature point position candidate area set in step S602 is set as the search area 1003. In such a case, the feature vector generation area setting portion 103 sets a feature vector generation area 1004 one by one in turn from the search area 1003.

Returning to the explanation of FIG. 9, in step S604, the feature vector generating portion 104 generates the feature vector from the feature vector generation area. A manner of generating the feature vector is similar to that in the registration process.

Next, in step S605, the similarity calculating portion 106 calculates the similarity between the feature vector generated in the feature vector generating step S604 and the feature vector held in the registered feature vector holding portion 105. The similarity calculating portion 106 employs the normalized correlation expressed by the following formula (1), for example, when calculating the similarity. In the formula (1), S represents the similarity, F represents the feature vector generated in step S604, and F(i) represents the i-th element of the relevant feature vector. Further, G represents the feature vector held in the registered feature vector holding portion 105, and G(i) similarly represents the i-th element thereof. In addition, ∥F∥ represents the norm of a vector F.

$$S = \frac{\sum_i F(i) \cdot G(i)}{\|F\|\|G\|} \quad (1)$$

The normalized correlation is one technique for calculating the similarity, and the similarity calculating portion 106 may use a vector distance expressed, for example, by square errors between respective elements of vectors. When the registered feature vector holding portion 105 registers the feature vectors generated from a plurality of registered face images, the similarity calculating portion 106 calculates the similarity for each of the registered face images.

In step S606, the similarity calculating portion 106 determines whether the feature vectors have been generated and the similarities have been calculated over the entire search area. If not so, the similarity calculating portion 106 shifts the processing to step S603. Then, the feature vector generation area setting portion 103 sets the next feature vector generation area in the search area.

In step S607, the representative similarity calculating portion 107 calculates the representative similarity in the relevant search area from the plurality of calculated similarities. A calculation manner is not limited to a particular one. The representative similarity may be provided as the maximum similarity among the plurality of calculated similarities, or a mean of a predetermined number of higher similarities.

In step S608, the representative similarity calculating portion 107 determines whether the calculated representative similarity is obtained in all the search areas set in the search area setting step S602, i.e., whether the similarities in all the local area are obtained. If not so, the feature vector generation area setting portion 103 selects the next search area and executes the processing from step S603 in the selected search area.

In step S609, the representative similarity integrating portion 108 integrates the similarities in all the search areas, i.e., in all the local areas, thereby calculating the integrated representative similarity between the input evaluated face image and one registered face image. A manner of calculating the integrated representative similarity is not limited to a particular one. The integrated representative similarity may be a mean of all the representative similarities or a mean of a predetermined number of higher similarities. When the registered feature vector holding portion 105 registers the feature vectors generated from a plurality of registered face images, the representative similarity integrating portion 108 calculates a plurality of integrated representative similarities.

In step S610, the classifying portion 109 classifies the input evaluated face image by using the integrated representative similarity calculated in step S609. The classifying portion 109 executes the classification by comparing the integrated representative similarity with a predetermined threshold set in advance, and by setting the ID of the evaluated face image to be the same as the ID of the registered face image if the integrated representative similarity is not less than the threshold. If the integrated representative similarity is not more than the threshold, the classifying portion 109 sets the ID of the evaluated face image to be not the same as the ID of the registered face image. When the registered feature vector holding portion 105 registers the feature vectors generated from a plurality of registered face images, a plurality of integrated representative similarities are obtained. Therefore, the classifying portion 109 selects maximum one from among the plurality of integrated representative similarities. Further, if a value of the selected integrated representative similarity exceeds the predetermined threshold, the classifying portion 109 sets the ID of the evaluated face image to be the same as the ID of the registered face image that provides the maximum integrated representative similarity. If such a value does not exceed the threshold, the classifying portion 109 determines that the face image corresponding to the ID of the evaluated face image is not registered.

While the above description has been made as using Convolutional Neural Network as the technique for detecting the face organ features, the detection technique is not limited to the above-described one because this embodiment just requires the presence of a distribution corresponding to the existence probability distribution of each of the detected face organ feature. For example, a template of the face organ feature as a detection target may be used (the template being formed, for example, from a mean image of many face organ features). A matching score (e.g., a correlation value) obtained by moving the template in the local area to examine matching can be regarded as the existence probability distribution of the relevant face organ feature.

While the reference local area is set as the search area in the registration process as described above, the reference local area may be extended and set as the search area by utilizing the distribution of the values of the results of detecting the face organ feature as in the evaluation process described later. In such a case, a plurality of registered feature vectors are obtained for one certain search area. In step S605, therefore, the similarity calculating portion 106 calculates similarities for all combinations of the plurality of registered feature vectors and the plurality of feature vectors generated from the input face image. Further, when the representative similarity calculating portion 107 calculates the representative similarity in step S607, it employs the similarities calculated for all the combinations.

Thus, according to this embodiment, the above-described degradation in accuracy can be suppressed by using a plurality of local areas obtained from the area that is set in consideration of the cause generating an error in setting the position of the local area.

Be it noted that this embodiment and the following Second embodiment are described in connection with an example of classifying a face, but a pattern to be classified is not limited to the face. The pattern to be classified may be, for example, a general object such as a car or a bicycle.

<Second Embodiment>

A second embodiment differs from the first embodiment in the detection manner (detection process) in the face organ feature point detecting portion 101 and the manner of setting the search area (setting process) in the search area setting portion 102.

The manner of detecting the face organ feature and the manner of setting the search area according to this embodiment will be described below.

Figure 14:
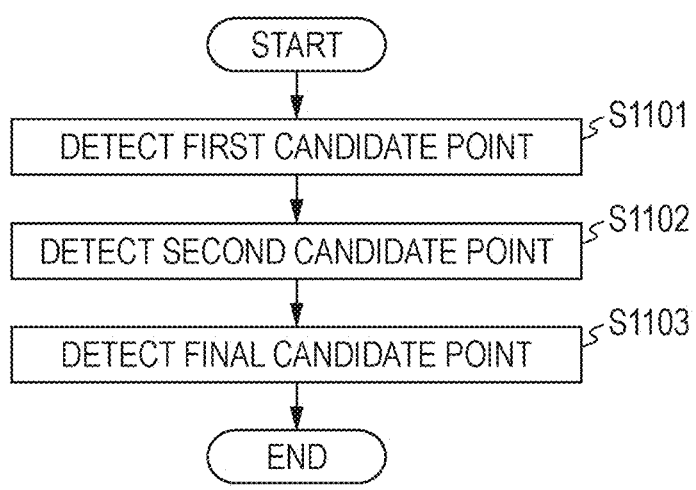
FIG. 14 is a flowchart illustrating one example of a face organ feature point detection process.

FIG. 14 is a flowchart illustrating one example of a face organ feature point detection process. With the face organ feature point detection in the second embodiment, after detecting a first candidate point for the face organ feature point in a similar manner to that in the first embodiment, a second candidate point is detected by using the first candidate point. Finally, the feature point is detected by using the results of respective processes that have been executed to detect the second candidate point and the first candidate point.

In step S1101, the face organ feature point detecting portion 101 detects all the face organ feature points by using, e.g., the manner described in the first embodiment. The face organ feature point detecting portion 101 sets the detection results as first candidate points.

In step S1102, the face organ feature point detecting portion 101 detects second candidate points for the face organ feature points by using the first candidate point. A manner of detecting the second candidate points will be described later.

In step S1103, the face organ feature point detecting portion 101 finally detects the face organ feature points by using the results of respective processes that have been executed to detect the second candidate points and the first candidate points for the face organ feature points. Details of such processing will be described later.

FIG. 15 illustrates an outline of the processing executed in step S1102.

In FIG. 15, numeral 1201 denotes a first candidate point group, and 1202 denotes a second candidate point group. More specifically, the face organ feature point detecting portion 101 detects the second candidate point by utilizing projection of the first candidate point onto an eigenspace and back-projection of a resulted projection vector. Stated another way, this embodiment utilizes, as knowledge regarding the positional relationships among the face organ feature points, the eigenspace that is obtained from respective coordinate values of the face organ feature points.

The eigenspace used herein is previously calculated based on a plurality of teacher data. Here, the eigenspace is expressed by an orthonormal matrix F.

A manner of generating the eigenspace is now described. One certain teacher data is provided as a vector representing coordinate values of a plurality of face organ feature points that are present in one face image. The coordinate vector is expressed by the following formula.

$$v_l = (x_{l1}, y_{l1}, x_{l2}, y_{l2}, \ldots x_{lp}, y_{lp}) \quad (2)$$

In the formula (2), $v_l$ represents a coordinate vector obtained from a number p of reference points in the l-th image. It is assumed that the coordinates of the face organ feature points, which are used as the teacher data, are given as correct values by manual inputting, for example.

A manner of calculating the eigenspace, i.e., the orthonormal matrix F, used here by utilizing the coordinate vector expressed by the formula (2) will be described below. Be it noted that eigenvectors used in an eigenspace filter are obtained by the principal component analysis.

First, the face organ feature point detecting portion 101 acquires the coordinate vector, expressed by the formula (2), from each of various face images and deduces a variance-covariance matrix C expressed by the following formula (3). The variance-covariance matrix C represents the case where there are a number q of teacher data.

$$C = \frac{1}{q}\sum_{i=1}^{q}\sum_{j=1}^{q}(v_i - \bar{v})(v_j - \bar{v})^T \quad (3)$$

In the formula (3), $\bar{v}$ is a mean vector and is expressed by the following formula (4).

$$\bar{v} = \frac{1}{q}\sum_{i=1}^{q}v_i \quad (4)$$

It is generally known that, assuming a variance-covariance matrix to be C, an eigenvalue matrix to be Λ, and an orthonormal matrix to be G, those matrices satisfy the following formula (5). Therefore, the face organ feature point detecting portion 101 can obtain the orthonormal matrix G by solving the eigenvalue problem expressed by the formula (5).

$$CG=G\Lambda \quad (5)$$

From the orthonormal matrix G, the face organ feature point detecting portion 101 selects a number, e.g., k of eigenvectors from the uppermost rank in terms of a cumulative contribution ratio of the eigenvalue, thereby generating an orthonormal matrix F that is used to express the eigenspace. In other words, the contribution of each of the eigenvectors obtained from the formula (5) can be measured in terms of the eigenvalue. By generating the orthonormal matrix F with important eigenvectors based on the eigenvalues, the eigenspace expressed by the orthonormal matrix F can represent the general positional relationships among the face organ feature points.

Subsequently, an actual operation is described.

Let assume a vector representing the first candidate to be d. Assuming, for example, that the first candidate points are given by seven points corresponding to the outer and inner corners of each of the left and right eyes, the nose, and the opposite ends of the mouth as illustrated in FIG. 15, the vector d has 14 dimensions (=7*2). Next, the face organ feature point detecting portion 101 projects the vector d onto the eigenspace. Assuming a projection vector to be d*, the projection vector d* has k (<d) dimensions. Then, the face organ feature point detecting portion 101 transforms the projection vector d* having the reduced dimensions to coordinate values in the original image space through back projection. A matrix used for the back projection can be obtained as a pseudo inverse matrix of the eigenspace F. Assuming a vector after the back projection to be d^, the vector d^ has 14 dimensions and coordinate values expressed by elements of the vector d^ provide respective coordinate values of the second organ feature points for the face organ feature points.

Figure 16A:
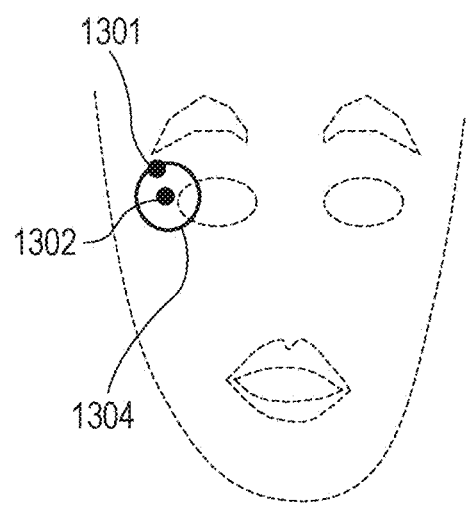
FIGS. 16A and 16B illustrates a final feature point detection process in connection with, for example, detection of the outer corner of the eye.
Figure 16B:
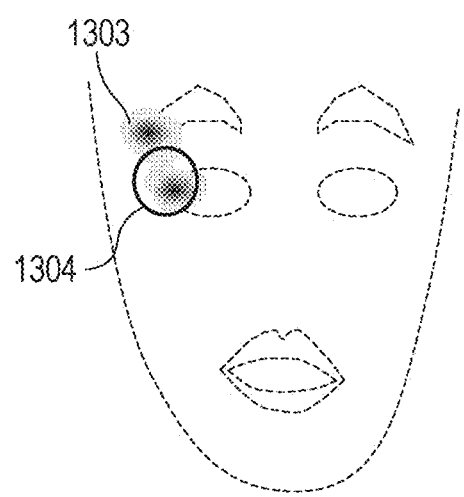

Subsequently, a final feature point detection process is described. FIGS. 16A and 16B illustrate the final feature point detection process in connection with, for example, detection of the outer corner of the eye. In FIG. 16A, numeral 1301 denotes the first candidate point, 1302 denotes the second candidate point, and 1304 denotes a distribution area of output values of the detection results, which is used in the final feature point detection process. Also, in FIG. 16B, numeral 1303 denotes a distribution of output values of the results of detecting the first candidate point, and 1304 denotes a distribution area of output values of the detection results, which is used in the final feature point detection process.

As described in the first embodiment, erroneous detection may be caused near the outer corner of the eye. For example, because the outer corner of the eye and the end of the eyebrow are analogous in shape, the eyebrow may be erroneously detected when the outer corner of the eye is to be detected. A distribution of the output values in such a case is denoted by 1303 in FIG. 16. The result of obtaining the barycenter of the distribution of output values is the first candidate 1301. In other words, because there is a distribution of higher output values not only around the outer corner of the eye, but also around the end of the eyebrow, the position of the barycenter is present intermediate between the outer corner of the eye and the end of the eyebrow. The second candidate point obtained from the coordinates of the position of the barycenter by using the above-mentioned eigenspace is denoted by 1302. Thus, as illustrated in FIG. 16, the second candidate point obtained by using the positional relationships with respect to the other first candidate points, such as the inner corner of the eye and the mouth, takes coordinate values closer to the outer corner of the eye. Speaking in short, the second candidate point is given by a mean distribution of many data, and it does not provide a correct solution of each data. Hence, an abnormal value deviating far can be corrected to some extent, but a correct value is not assured. However, the feature point can be regarded as being positioned near the second candidate point.

Accordingly, the face organ feature point detecting portion 101 determines the barycenter or the maximum value for the distribution 1303 of the output values of the results of detecting the first candidate point in the vicinity 1304 of the second candidate point 1302 that is assumed to be the center, and then sets the determined value as the position of the final feature point. The size of the vicinity may be a fixed value obtained by analyzing an error, or may be the distance between the first candidate point and the second candidate point, for example.

The foregoing is the description of the feature point detection process in the second embodiment.

Subsequently, the search area setting process is described. The search area setting is described in connection with the case of changing the setting in the evaluation process in the first embodiment. In other words, the registration process is executed by employing the basic local area as in the first embodiment. However, a plurality of feature vectors may be generated from the registered face image by setting the search area in the registration process to be wider than the basic local area.

Figure 17:
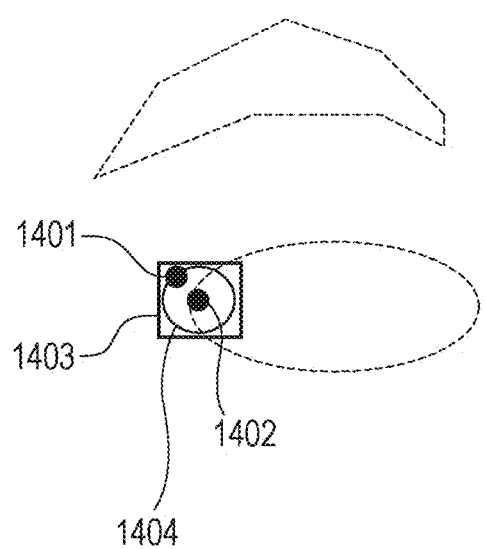
FIG. 17 illustrates the search area setting process in connection with, for example, the detection of the outer corner of the eye.

FIG. 17 illustrates the search area setting process in connection with, for example, the detection of the outer corner of the eye. In FIG. 17, numeral 1401 denotes the second candidate point in the face organ feature point detection process, 1402 denotes the position of the feature point detected by the face organ feature point detection process, 1403 denotes a rectangle indicating the size of a search range, and 1404 denotes a circle of which radius is equal to the distance between the second candidate point and the position of the feature point.

As described above in the face organ feature point detection process, the second candidate point represents the position of the face organ feature point, which is estimated from the positional relationships between many data and the first candidate point, and hence represents a mean position deduced from those positional relationships. Further, the position of the final feature point is detected from the distribution of the outputs of the detection results as in the first embodiment. Therefore, even when the position of the feature point is detected by using the above-described manner, an error is caused in the detected position. For that reason, the face organ feature point detecting portion 101 sets a range of the search area on the basis of a deviation between the position of the second candidate point and the position of the finally detected feature point.

Stated another way, the face organ feature point detecting portion 101 determines a rectangle circumscribing the circle 1404 of which radius is equal to the distance between the second candidate point and the position of the feature point, and then sets the rectangle as the size of the search area. The rectangle representing the size of the search area is denoted by 1403.

Figure 18:
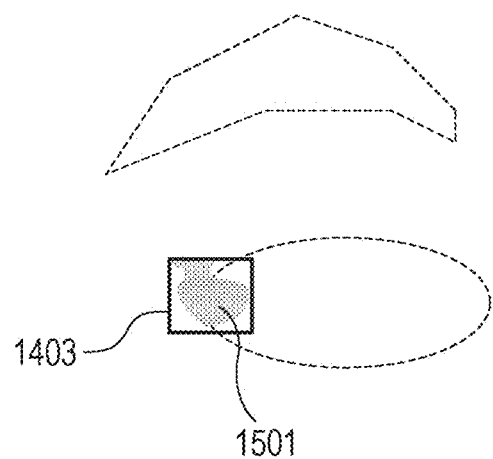
FIG. 18 is an illustration to explain a search range.

Further, as illustrated in FIG. 18, the face organ feature point detecting portion 101 may use, as a mask for the search area, an AND area 1501 of the rectangle 1403 and the area that is obtained by binarizing, with respect to a threshold, the distribution of the output values resulting from detecting the feature point, which has been described above in the first embodiment. FIG. 18 is an illustration to explain the search range. The setting of the search area is similar to that in the first embodiment and hence the description thereof is omitted.

Thus, according to the second embodiment, a position of the face organ feature point is estimated from many data and the distribution of the position of the feature point having been first detected, and the search range is set from the relationship between the estimated position and the position of the feature point having been second detected. As a result, the search area can be restricted and an increase of processing time can be further suppressed.

In the first and second embodiments, the search area is set in the evaluation process by using the results of detecting the face organ feature points on the input face image. When real-time detection is required, the search area for the evaluated face image is set to the basic local area, while the search area in the registration process may be set wider than the basic local area. This leads to an advantage that, if the search area is set wider for the input face image, processing necessary for setting the wider search area is additionally generated to prolong the processing time, but the influence of an increase in the processing time caused by setting the wider search area on the registered face image is not substantially generated because the registration process is executed in advance.

Further, the size of the search range set on the registered image may be a fixed value instead of utilizing the distribution of the output values of the results of detecting the face organ feature points on the registered image alone and the result of correcting the eigenspace. Namely, sizes of search areas may be previously determined based on many data by utilizing the distribution of the output values of the results of detecting the face organ feature points and the result of correcting the eigenspace, and a mean value, for example, of those sizes may be used as the fixed-value size of the search range. In such a case, the processing to determine the size of the search area on the registered image can be further omitted.

The distribution of the output values of the results of detecting the face organ feature points and the result of correcting the eigenspace are affected by a face rotation in the direction of depth. Accordingly, the size of the search range determined from many data in advance by utilizing the distribution of the output values of the results of detecting the face organ feature points and the result of correcting the eigenspace may be held for each face orientation. Then, by executing a process of detecting the face rotation in the direction of depth for the registered face image and/or the input face image, the fixed-value size of the search range may be selected depending on the detected face orientation. This enables the processing to be adapted for change of the face orientation even when the fixed value is used as the size of the search area.

As described above, representative similarity is obtained from among a plurality of similarities that are calculated by setting a search area and using a plurality of local areas within the search area, and the representative similarity is employed as indicating the similarity between the respective search areas in an input pattern and in a registered pattern. Therefore, even when an error is caused in the detection of the feature point, degradation in recognition accuracy can be suppressed. Another advantage is that since the search area is set by using a parameter related to an error caused in detecting the face organ feature points, the recognition accuracy can be increased while an increase in the computation load can be minimized.

<Third Embodiment>

In a third embodiment, an area shape is deformed to provide a plurality of varied local areas for the reference local area instead of changing its position. The third embodiment is described below in connection with an application to the face recognition process as in the first and second embodiments.

Figure 19:
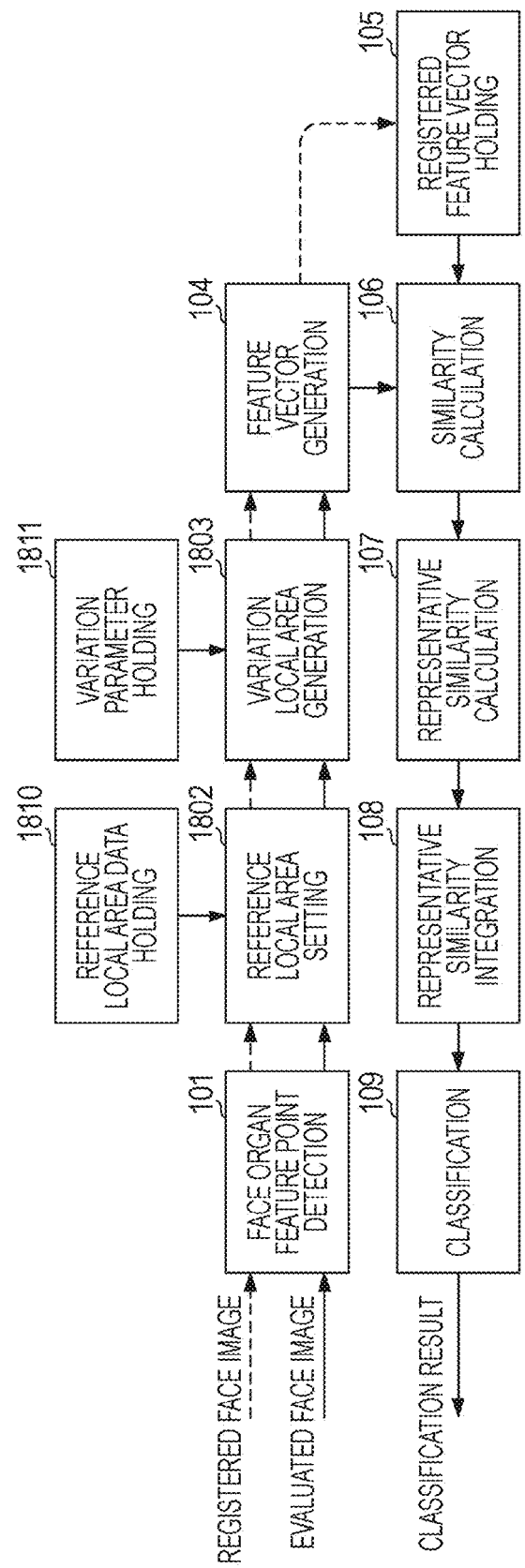
FIG. 19 is a block diagram illustrating another example of the functional configuration of the pattern classifier.

FIG. 19 is a block diagram illustrating the configuration of this embodiment. In FIG. 19, components denoted by the same numbers as those in FIG. 2 have similar functions. The configuration of FIG. 19 differs from that of FIG. 2 in a reference local area setting portion 1802, a varied local area generating portion 1803, a reference local area data holding portion 1810, and a variation parameter holding portion 1811.

The reference local area setting portion 1802 sets the reference local area in the input face image based on the output of the face organ feature point detecting portion 101. The processing executed here is similar to the reference search area setting that is executed in the registration process in the first embodiment. Thus, the center position of the reference local area in the form of a rectangle having a predetermined size is set based on a displacement from each of the feature points detected by the face organ feature point detecting portion 101.

The reference local area data holding portion 1810 holds the type of the feature point, the amount of displacement, and the size of the local area, which are used in the reference local area setting portion 1802 to set the reference local area. The varied local area generating portion 1803 generates a plurality of varied local areas corresponding to each reference local area. A manner of generating the varied local areas will be described later. The variation parameter holding portion 1811 holds variation parameters used in the varied local area generating portion 1803.

Subsequently, the operation of a classification process in this embodiment and the individual components in FIG. 19 are described with reference to flowcharts of FIGS. 20 and 21. In FIG. 19, as in FIG. 2, broken lines indicate the registration process, and solid lines indicate the evaluation process.

[Registration Process]

Figure 20:
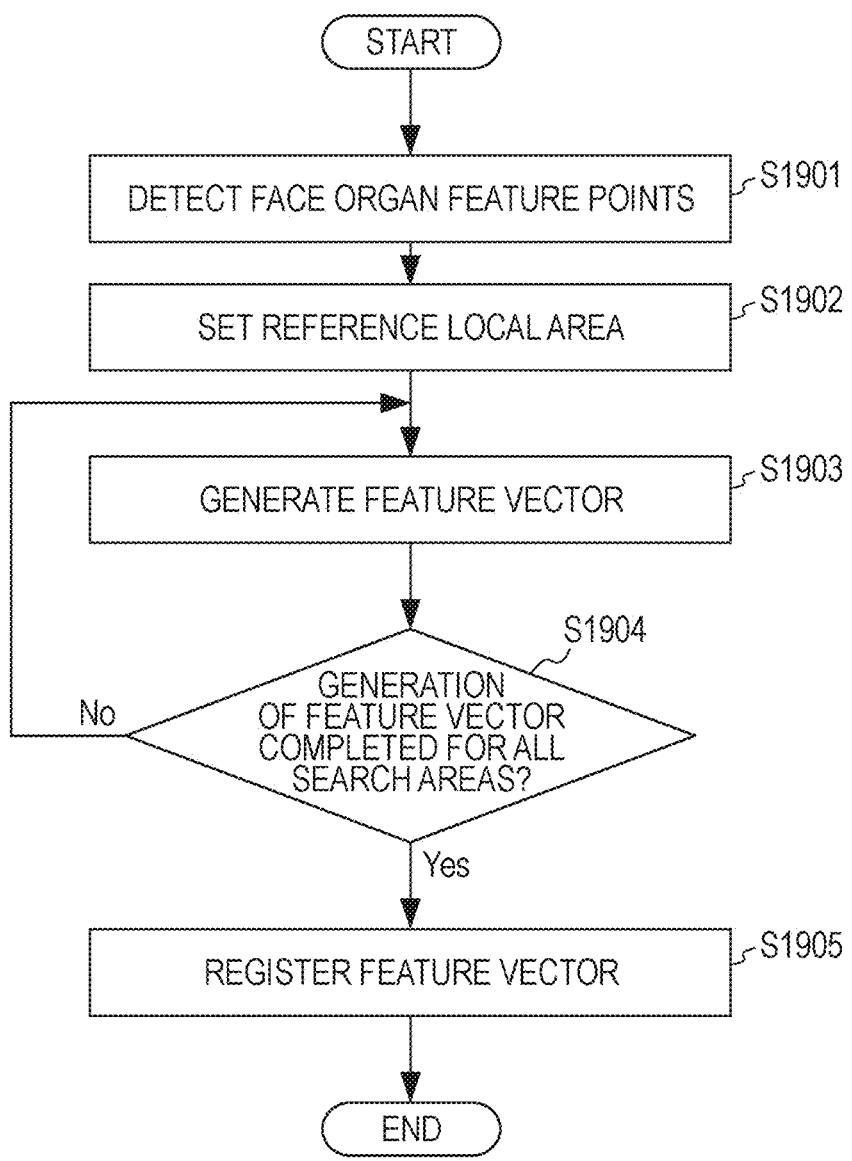
FIG. 20 is a flowchart illustrating another example of the registration process.
Figure 21:
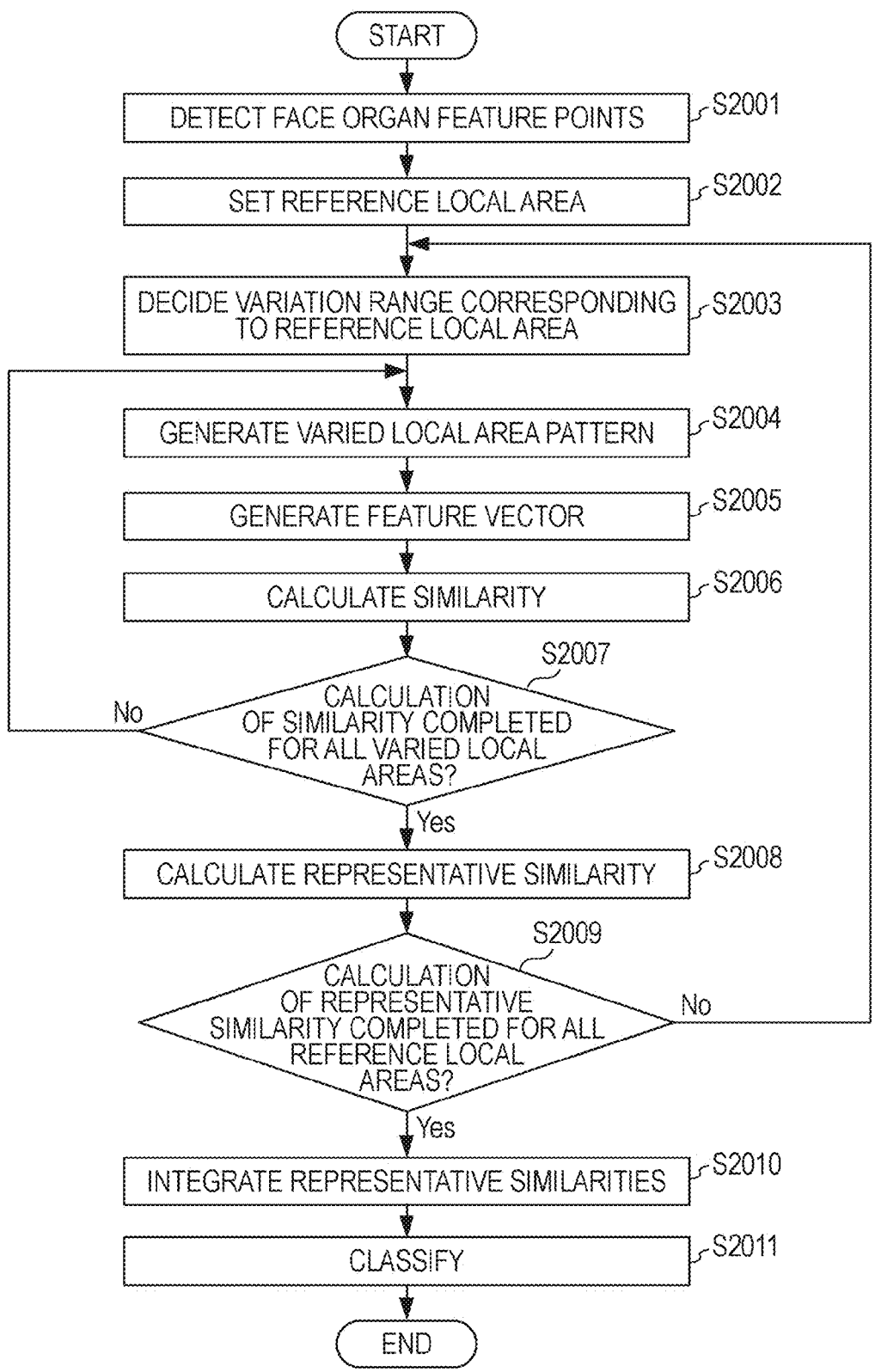
FIG. 21 is a flowchart illustrating another example of the evaluation process.

FIG. 20 is a flowchart of the registration process, and it corresponds to FIG. 3 in the first embodiment.

Detection of the face organ feature points in step S1901 is exactly the same as that in step S201 of FIG. 3, and hence the description thereof is omitted.

Setting of the reference local area in step S1902 corresponds to the setting of the search area in step S202 of FIG. 3. In the above-described step S202, a plurality of reference local areas each being identical to the reference search area, illustrated in FIG. 8A, are set and the search area is regarded as the reference local area itself (namely, the search area is set at one center position of each reference local area). In step S1902, the processing until the setting of the reference local area is executed in a similar manner to that in step S202. Here, the type of the feature point, the amount of displacement, and the size of the reference local area, which are used to set the center position of the reference local area, are held in the reference local area data holding portion 1810 that corresponds to the reference search area data holding portion 110 in FIG. 2.

In this embodiment, the reference local area is used, as it is, in the registration process without varying it. Stated another way, the reference local area is handled directly as the feature vector generation area in the first embodiment. In this case, the varied local area generating portion 1803 is skipped.

In a feature vector generation step S1903, processing similar to that in step S204 of FIG. 3 is executed on the reference local area. As in the first embodiment, brightness values of all pixels in the relevant area may be used as a one-dimensional vector, or a projection vector obtained by projecting the one-dimensional vector onto the previously-obtained eigenspace may be used as the feature vector. Thus, a feature vector generating portion 104 in FIG. 19 is the same as that in FIG. 2.

In step S1904, as in step S205, it is determined whether the feature vectors corresponding to all the reference local areas, which have been set at plural positions in step S1902, have been generated. If the feature vectors corresponding to all the reference local areas have been generated, the processing is advanced to a feature vector registration step S1905, and if not yet generated, the processing of step S1903 is repeated.

In step S1905, as in step S206, a set of the feature vectors corresponding to all the reference local areas are registered in a registered feature vector holding portion 105 as the registered feature vectors of the relevant registered image.

The foregoing is the registration process for one registered face image in this embodiment. When there are a plurality of registered images, the above-described processing is repeated as in the first embodiment.

[Evaluation Process Flow]

Subsequently, the evaluation process is described. FIG. 21 illustrates a flowchart of the evaluation process in this embodiment and corresponds to FIG. 9 in the first embodiment.

Detection of the face organ feature points in step S2001 is the same as that in each of step S1901 and step S601. Setting of the reference local area in step S2002 is the same as that in step S1902. Through those steps, a plurality of reference local areas are set on the evaluated face image.

Step S2003 is at the head of a processing loop for each of the reference local areas. Here, a range of each variation parameter for generating a plurality of varied local areas corresponding to the reference local area is decided by referring to the parameter held in the variation parameter holding portion 1811. Details of step S2003 will be described later.

Generation of the varied local area in step S2004 corresponds to a process of setting the feature vector generation area in step S603 in the first embodiment. In step S603, as described above, an area image having the same size as the reference local area is cut out from each position within the search range. On the other hand, in step S2004, one set of variation parameters in a variation range is selected and images each having the same size as the reference local area are generated as varied local area patterns by referring to pixels near (within or around) the reference local area based on the selected set of variation parameters. Details of step S2004 will be described later.

In subsequent step S2005, processing similar to that in step S1903 in the registration process is executed on an image of the varied local area pattern, thereby generating the feature vector.

In step S2006, calculation of similarity is executed in a similar manner to that in step S605 in the first embodiment. More specifically, similarity is calculated between the feature vector of the varied local area pattern, which has been generated in step S2005, and the feature vector of the corresponding reference local area, which is held in the registered feature vector holding portion 105. A manner of calculating the similarity is the same as that in the first embodiment.

In step S2007, it is determined whether the calculation of the similarity is completed for all the varied local areas corresponding to the reference local area under processing, which fall within the variation range set in step S2003. If not yet completed, the processing on the next varied local area is started from step S2004.

A representative similarity calculation step S2008 corresponds to step S607 in the first embodiment. More specifically, representative similarity is calculated from the similarities of the plurality of varied local area patterns, which have been obtained for the reference local area. A manner of calculating the representative similarity is not limited to a particular one as in the first embodiment. The representative similarity may be provided by selecting maximum similarity or by taking a mean of plural higher similarities.

In step S2009, as in step S608, it is determined whether the representative similarity has been calculated for all the reference local areas (i.e., whether the processing is completed for all the reference local areas on the evaluated face image). If not yet completely calculated, the processing is returned to step S2003 to execute the processing on the next reference local area.

In step S2010, a representative similarity integration process is executed in a similar manner to that in step S609 in the first embodiment. In subsequent step S2011, a classification process is executed in a similar manner to that in step S610.

[Scaling-Up and -Down Variation Process]

Figure 22A:
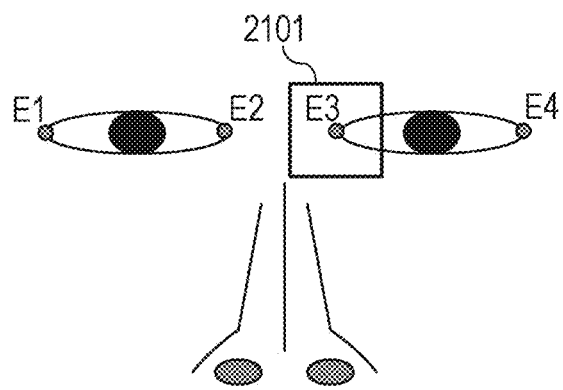
FIGS. 22A to 22C illustrate one example of a part of a registered face image and a part of an evaluated face image.
Figure 22B:
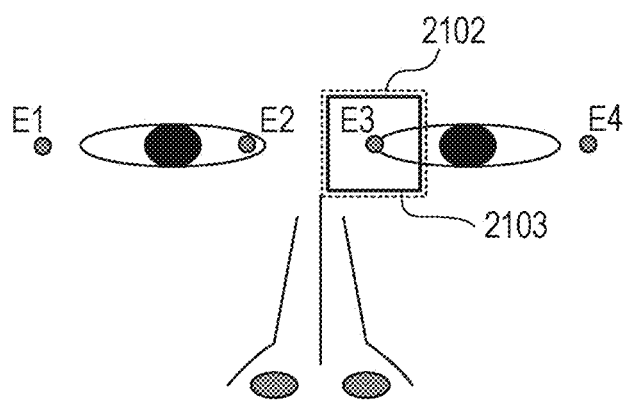
Figure 22C:
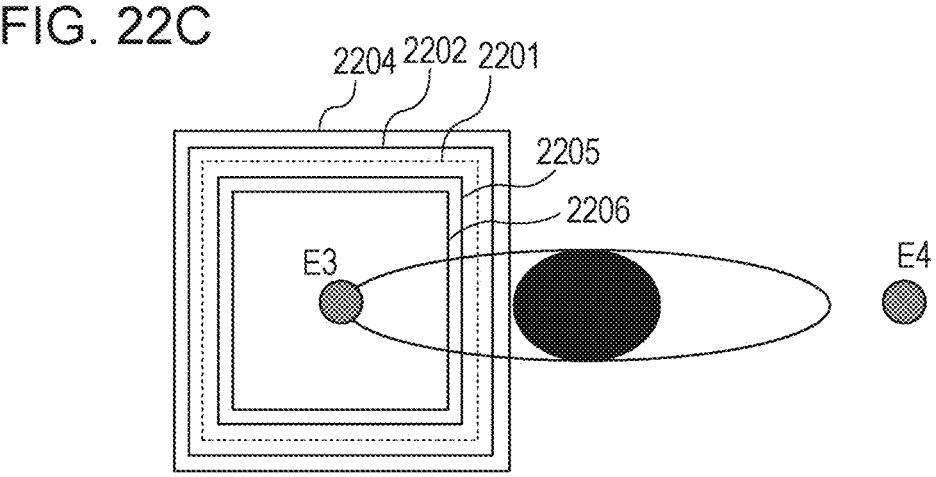

Next, one example of a manner of deciding the parameter variation range in step S2003 and a manner of generating the varied local area pattern in step S2004 will be described below. FIGS. 22A to 22C are each an illustration to explain the case of executing, as a variation process, a zooming process (scaling-up and -down) with an area center position held fixed.

FIG. 22A illustrates a part of a registered face image of a certain person. The face image of FIG. 22A is normalized on the basis of feature points E1 to E4 such that both the eyes are located at predetermined positions. (It is assumed that a midpoint between E1 and E2 is the position of the left eye and a midpoint between E3 and E4 is the position of the right eye.) Numeral 2101 denotes the reference local area set on the basis of the feature point E3 such that amounts dw and dh of displacement of an area center position are both 0. In the registration process, as described above, the feature vector based on the reference local area is generated and is held in the registered feature vector holding portion 105 as a part of the registered feature vectors corresponding to the face image of FIG. 22A.

FIG. 22B illustrates a part of the face image of the same person whose face image is illustrated in FIG. 22A. The evaluated face image of FIG. 22B is normalized on the basis of the feature points E1 to E4 as in the registered face image. An area 2102 (rectangle indicated by dotted lines) represents the reference local area, which corresponds to the reference local area 2101 in the registered face image and which is on the basis of the feature point E3 on the evaluated face image of FIG. 22B. Numeral 2103 denotes one example obtained by scaling down the size of the relevant reference local area with its center position held fixed.

Because the feature points E1, E2 and E4 detected on the evaluated face image cause deviations in their positions due to erroneous detection, the face image of FIG. 22B after the normalization is slightly reduced to a smaller size than the registered face image of FIG. 22A. Accordingly, a degree of matching between the feature vector generated from the reference local area 2101 on the registered face image of FIG. 22A and the feature vector generated from the reference local area 2102 on the evaluated face image of FIG. 22B is not so high. The feature vector generated from the smaller area 2103 on FIG. 22B than the area 2102 has a higher degree of matching with the feature vector generated from the area 2101.

Generally, it is very difficult to determine whether the detected position of the feature point is deviated, or to determine at what extent the detected position of the feature point is deviated in which direction (namely, if the detected position of the feature point can be determined, it is just required to correct the position of the feature point itself). For that reason, a conceivable varied local area is generated plural for one reference local area. Deciding a set of those plural variation parameters for each reference local area is a process of deciding the variation range in step S2003. The variation range corresponding to each reference local area is statistically learned from many sample face images in advance and is held in the variation parameter holding portion 1811. In step S2003, plural ones among the variation parameters are selected which fall within the variation range corresponding to the reference local area under processing.

FIG. 22C is an enlarged view of the right eye, as viewed in the direction confronting the face from the front, in the evaluated face image of FIG. 22B. FIG. 22C indicates a plurality of varied local areas (more exactly, a plurality of pixel areas that are referred to when the varied local areas are generated) corresponding to a reference local area 2201 (=2102) that has been set on the basis of the feature point E3. Because the variation process is executed as the scaling-up and -down process with the area center position held fixed as described above, the variation parameter is expressed by a scaling factor. The variation range of the reference local area 2201 is set as the variation parameters with five scaling factors of [0.8, 0.9, 1.0, 1.1, and 1.2].

An area 2206 represents a referred area to generate an image of the varied local area pattern with the scaling factor of 1.2, and an image having the same size as the reference local area 2201 can be generated by scaling up the image of the relevant referred area 1.2 times. Similarly, an area 2205 represents a referred area corresponding to the scaling factor of 1.1, an area 2201 represents a referred area corresponding to the scaling factor of 1.0 (i.e., without zooming), an area 2202 represents a referred area corresponding to the scaling factor of 0.9 (i.e. scaling-down), and an area 2204 represents a referred area corresponding to the scaling factor of 0.8.

When reliability in detection of the feature point can be calculated as in the above-described CNN (Cellular Neural Network), the variation range may be set on the basis of reliability. For example, when reliabilities for all the feature points E1 to E4 related to the eyes are sufficiently high, it is considered that the evaluated face image of FIG. 22B after the normalization has the size not significantly differing from the size of the registered face image of FIG. 22A after the normalization. In such a case, the variation range may be narrowed to, for example, three variation parameters with the scaling factors of [0.9, 1.0, and 1.1].

In step S2004, the decided variation parameters falling within the variation range are selected one by one for each set, and an image of the varied local area pattern is generated from the image in the referred area near (within or around) the corresponding reference local area. Values to be calculated in this step S2004 are values of all pixels in the image of the varied local area pattern. Those values are calculated as follows by referring to pixels in the referred area near (within or around) the reference local area.

First, coordinates in the referred area corresponding to coordinate values of individual pixels in the varied local area pattern are calculated. Coordinates of each corresponding point in the referred area are provided as (x/c, y/c) by assuming the center point of the referred area to be the origin (0, 0) and dividing coordinates (x, y) of each point by a corresponding scaling factor (=c).

On that occasion, because the coordinates of the corresponding point in the referred area are usually expressed by real numbers, the individual pixel values in the image of the varied local area pattern can be calculated by referring to adjacent four pixels within the referred area and by performing bilinear interpolation in accordance with the distances to those pixels. The pixel values can also be decided by using other calculation methods such as taking values of the pixel nearest to the coordinates of the corresponding point or making bi-cubic interpolation while referring to 16 pixels thereabout.

[Rotation Variation Process]

In some cases, a rotation process is more preferable as the variation process. FIGS. 23A to 23C are each an illustration to explain the case of executing, as the variation process, the rotation process with the area center position held fixed.

FIG. 23A illustrates a part of a registered face image of a certain person after normalization, which is the same as that illustrated in FIG. 22A. In FIG. 23A, numeral 2301 denotes a reference local area set on the basis of the feature point E3.

Further, FIG. 23B illustrates a part of an evaluated face image, differing from that of FIG. 22B, of the same person from whom the registered face image of FIG. 23A is obtained. Here, because E1, E2 and E4 are erroneously detected as illustrated in FIG. 23B, a segment between both the eyes of the evaluated face image is normalized in a state inclined from the horizontal. In such a case, a feature vector generated from a reference local area 2302 (rectangle indicated by dotted lines), which is set from the feature point E3 not deviated in position, is not so matched with the feature vector that is generated from the reference local area 2301 and registered in advance. A degree of matching is rather increased with respect to a feature vector generated from a rectangular area 2303 (rectangle indicated by solid lines), which is inclined about 10 degrees to the right (clockwise). In that case, similarity between areas of the same person is increased and improvement of an identification rate is expected by executing the rotation process as the variation process.

FIG. 23C is an enlarged view of the right eye, as viewed in the direction confronting the face from the front, in the evaluated face image of FIG. 23B. FIG. 23C indicates, as in FIG. 22C, a plurality of pixel areas that are referred to when the varied local areas corresponding to a reference local area 2401 (=2302) set on the basis of the feature point E3 are generated. Because the variation process is executed as the rightward (clockwise) and leftward (counterclockwise) rotation process with the area center position held fixed, the variation parameter is expressed by a rotational angle. The variation range of the reference local area 2401 is set as the variation parameters with five rotational angles of [−20°, −10°, 0°, +10°, and +20°]. Here, the minus angle represents a rotation in the leftward direction and the plus angle represents a rotation in the rightward direction.

An area 2406 represents a referred area to generate an image of the varied local area pattern with the rotational angle of −20°, and an image having the same angle as the reference local area 2401 can be generated as in the zooming process by rotating the image of the relevant referred area leftwards. Similarly, an area 2405 represents a referred area corresponding to the rotational angle of −10°, an area 2401 represents a referred area corresponding to the rotational angle of 0° (i.e., without rotation), an area 2402 represents a referred area corresponding to the rotational angle of +10° (i.e. rightward rotation), and an area 2204 represents a referred area corresponding to the rotational angle of 20°. Of course, as in the zooming process, the variation range may be restricted depending on reliability in the detection of the feature points.

A manner of generating the image of the varied local area pattern after the rotation process may be the same as that in the case utilizing the zooming process. More specifically, from the coordinates of each point in the image of the varied local area pattern, a corresponding coordinate point in the referred area can be provided by calculating a position that is resulted by reversely rotating the former coordinates through −r° corresponding to the rotational angle r° of the variation parameter with the area center point set as a center of the rotation. Because the coordinates of the corresponding point are also usually expressed by real numbers as in the case utilizing the zooming process, pixel values can be calculated through a similar interpolation process.

[Affine Transformation]

FIGS. 24A to 24C illustrate another example of the variation process. FIG. 24A illustrates a part of a registered face image, and numeral 2301 denotes a reference local area set on the basis of a feature point M1. FIG. 24B illustrates a part of an evaluated face image of the same person from whom the registered face image of FIG. 24A is obtained. The evaluated face image of FIG. 24B is an image of a face oriented slightly leftwards in comparison with the registered face image of FIG. 24A, which is oriented just to the front.

In the above case, even when the feature point M1 on the evaluated face image is not erroneously detected as illustrated, a degree of matching between the feature vector generated from a reference local area 2302 and the feature vector generated from the reference local area 2301 on the registered face image of FIG. 24A is reduced sometimes. In that case, the degree of matching can be increased by executing the variation process such that an image of a rhombic referred area indicated by 2303 is deformed into a rectangle having the same size as the reference local area.

Such a variation process can be executed through affine transformation expressed by the following formula (6).

$$\begin{pmatrix} x' \\ y' \end{pmatrix} = \begin{bmatrix} a_1 & a_2 & a_3 \\ b_1 & b_2 & b_3 \end{bmatrix} \begin{pmatrix} x \\ y \\ 1 \end{pmatrix} \quad (6)$$

In the formula (6), (x, y) represents coordinates of each pixel in the image of the varied local area pattern, and (x', y') represents coordinates of a point within the referred area, which corresponds to each pixel. Six parameters a1, a2, a3, b1, b2 and b3 are called affine parameters. A manner of calculating pixel values from the coordinates of the corresponding point is similar to that in the zooming process and the rotation process.

Further, when the affine transformation is used as the variation process, the variation process may be executed in a combined manner including not only the deformation of the rhombic shape, but also all the other processes, i.e., the process of moving the reference local area, which has been described in the first embodiment, and the zooming process and the rotation process both described in this embodiment.

When the affine transformation is utilized as the variation process, the variation range is provided by preparing sets of affine parameters in the same number as that of variations. The affine parameters in the case of no variations where the image in the reference local area is used as the image of the varied local area pattern without changes are given by a1=1, a2=0, a3=0, b1=0, b2=1, and b3=0 (i.e., (x', y')=(x, y)). Accordingly, the variation range for executing various combined minute variations with the reference local area being at a center can be provided by oscillating each of variation values Δa1, Δa2, Δa3, Δb1, Δb2 and Δb3 independently of one another over a predetermined range between positive and negative decimal values (e.g., −0.1 to +0.1) at intervals of a predetermined step (e.g., 0.1) so as to set plural sets of affine parameters, which are expressed by the following formula (7).

$$\begin{pmatrix} x' \\ y' \end{pmatrix} = \begin{bmatrix} 1+\Delta a_1 & \Delta a_2 & \Delta a_3 \\ \Delta b_1 & 1+\Delta b_2 & \Delta b_3 \end{bmatrix} \begin{pmatrix} x \\ y \\ 1 \end{pmatrix} \quad (7)$$

By oscillating each variation value over the range of −0.1 to +0.1 at intervals of 0.1, three variation parameters for each of six variation values, i.e., a total number (sixth power of 3=729) of variation parameters, are set. If each variation value is oscillated over the same range at intervals of 0.05, five variation parameters are set for each variation value, and hence a total number (sixth power of 5=15625) of variation parameters are set. FIG. 24C illustrates one example of referred areas corresponding to various variations when the affine transformation process is executed in accordance with the affine parameters set as described above.

Values to be varied can be optionally selected by previously conducting statistical studies using a large number of sample images. For example, when there is a feature point that is apt to deviate in the horizontal direction, but it is hard to deviate in the vertical direction, an improvement of similarity is less affected even if the local area on the basis of such a feature point is not moved in the vertical direction. In such a case, therefore, the parameter for moving the area in the vertical direction, i.e., Δa3, can be fixedly set to 0.

[Others]

When the orientation or the expression of the face is changed, higher similarity can be obtained in some cases by executing, as the variation process, a deformation process employing a trapezoidal referred area rather than the rhombic referred area illustrated in FIG. 24. In such a case, the deformation process may be executed with, instead of the affine transformation, bilinear transformation (pseudo affine transformation) expressed by the following formula (8).

$$\begin{pmatrix} x' \\ y' \end{pmatrix} = \begin{bmatrix} a_1 & a_2 & a_3 & a_4 \\ b_1 & b_2 & b_3 & b_4 \end{bmatrix} \begin{pmatrix} x \\ xy \\ y \\ 1 \end{pmatrix} \quad (8)$$

The variation range can be set in a similar manner to that in the case utilizing the affine transformation. It is needless to say that the present invention can also be applied to other variation processes which are executed while referring to surrounding pixels.

While the variation process is executed in the evaluation process in this embodiment, the variation process may be executed in the registration process as in the first embodiment. Such a modification increases the amount of data of registered feature vectors corresponding to the additional setting of the variation range, but it can improve the processing speed because of no necessity of executing the variation process in the evaluation process.

<Fourth Embodiment>

When all of the assumed variation processes are executed on all the reference local areas to generate a large number of varied local areas, a very large processing load is resulted. In this embodiment, a manner of reducing the processing load by restricting the variation range for each of the reference local areas will be described below.

Figure 25A:
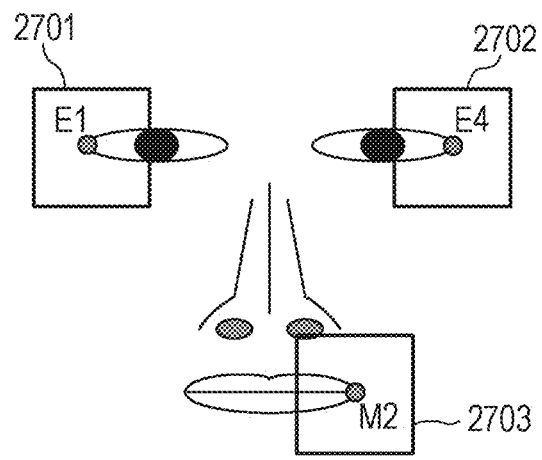
FIGS. 25A and 25B are each an illustration to explain a manner of restricting a variation range on the basis of areas having been processed.

FIG. 25A illustrates a part of a certain registered face image. Areas 2701, 2702 and 2703 represent reference local areas that are set on the basis of feature points E1, E4 and M2, respectively. Feature vectors generated from those areas are held as the registered feature vectors.

Figure 25B:
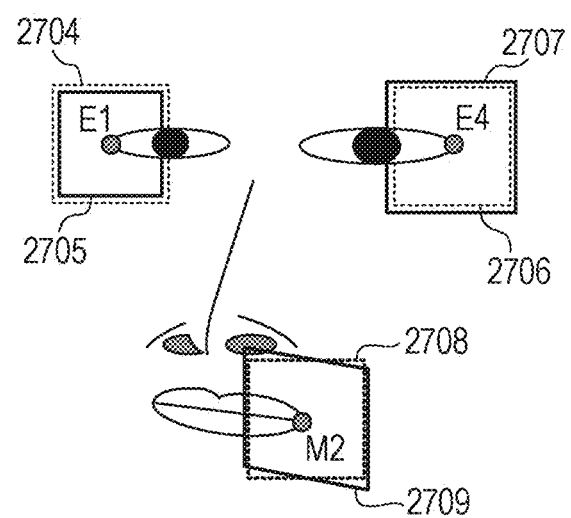

FIG. 25B illustrates one example of an evaluated face image of the same person from whom the registered face image of FIG. 25A is obtained. The evaluated face image of FIG. 25B is an image of a face oriented slightly leftwards from the front. It is here assumed that representative similarity corresponding to the reference local areas is calculated in the order of the areas 2701, 2702 and 2703. Further, it is assumed that each feature point is detected with sufficient accuracy (high reliability).

An area 2704 indicated by a broken-line frame is a reference local area that corresponds to the reference local area 2701 and that is present on the evaluated face image. However, a varied local area pattern having a maximum degree of matching and selected as providing the representative similarity is a scaled-up one that defines, as a referred pixel area, an area 2705 indicated by a solid-line frame.

Also, an area 2706 indicated by a broken-line frame is a reference local area that corresponds to the reference local area 2702 and that is present on the evaluated face image. However, a varied local area pattern having a maximum degree of matching and selected as providing the representative similarity is a scaled-down one that defines, as a referred pixel area, an area 2707 indicated by a solid-line frame.

The above processing is executed by employing the zooming process or the affine transformation process, which has been described in the third embodiment.

Next, the representative similarity corresponding to the reference local area 2703 is calculated. On that occasion, the corresponding reference local area on the evaluated face image is indicated by a broken-line frame 2708, but maximum similarity is provided by a varied local area pattern that defines a referred pixel area indicated by a solid-line frame 2709 and that is obtained through the affine transformation process using the rhombic area.

Because shapes of human faces are basically analogous to one another, respective areas generally vary in a similar tendency when the same variations are applied to the orientation, the expression, etc. of the faces. Since the evaluated face image of FIG. 25B is oriented slightly leftwards, the size of the local area near the outer corner E1 of the eye on the left side, as viewed in the direction confronting the face from the front, is reduced, while the size of the local area near the outer corner E4 of the eye on the right side, as viewed in the direction confronting the face from the front, is increased. The fact that the evaluated face image of FIG. 25B is oriented leftwards can be inferred from that the representative similarity of the reference local area 2701 is provided by the similarity of the area 2705 after the scaling-up process and the representative similarity of the reference local area 2702 is provided by the similarity of the area 2707 after the scaling-down process. In other words, the variation range corresponding to the reference area 2703 can be restricted such that the variation process is executed primarily as the affine transformation process employing the rhombic area indicated by 2709. Further, if one or more reference areas are present near 2709, the variation range can be similarly set for each of those areas.

While the above description is made in connection with the example where the variation attribute can be inferred as being oriented leftwards, the variation attribute may of course be an attribute that cannot be explicitly expressed by words. What variation range each area can take on the basis of variations of the range, for which the representative similarity has been calculated in advance, can be confirmed by statistically learning the cases using a large number of learning samples in advance and by holding, in the variation parameter holding portion 1811, variation range restriction information on the basis of the learning results.

Thus, by restricting the variation range based on the variation corresponding to the reference local area from which the representative similarity has been calculated, the processing load can be reduced for the reference local area that is processed in a later stage.

<Fifth Embodiment>

The variation range of each reference local area can be more positively restricted by previously determining the variation attribute that affects the face shape in the local area.

FIG. 26 illustrates the configuration of an embodiment in which an attribute causing variation in a face is to be determined. Comparing with the configuration described in the third embodiment, a variation attribute determining portion 2801 is inserted in FIG. 26 between the face organ feature point detecting portion 101 and the reference local area setting portion 1802.

The variation attribute determining portion 2801 determines the variation attribute affecting how the face appears, e.g., the orientation of the face and the type of expression thereof. Further, the variation attribute determining portion 2801 can use, as inputs, the position information of each feature point detected by the face organ feature point detecting portion 101 and the face image itself input to the face organ feature point detecting portion 101. In this embodiment, the face orientation is used as a primary variation attribute, and various techniques disclosed in NPL 5, for example, can be used in the attribute determination process.

Herein, a face oriented to the front (and having no expressions) are determined as a basic face image without variation, and a face oriented leftwards, rightwards, upwards or downwards (and a face with an expression, e.g., a smiling face) are determined as a face image with variation. Of course, the attribute with variation may be present plural.

The reference local area setting portion 1802 sets the reference local area corresponding to the basic face image without variation. In this embodiment, as in the third Embodiment, the reference local area is a rectangle having a predetermined size, of which position is determined on the basis of the feature point detected by the face organ feature point detecting portion 101. When the input face image has the attribute with variation, the position information of the reference local area is employed as a reference position for indicating a referred pixel area to generate a varied local area pattern.

The varied local area generating portion 1803 generates an image of the varied local area pattern in the registration process as well unlike the third embodiment. At this time, the varied local area pattern is generated one for each reference local area. The variation parameter for each local area corresponding to a particular variation can be learned in advance with the technique disclosed in NPL 6, for example, by using a large number of samples of paired images of the same person, which represent respectively the face without variation and the face with the particular variation. In NPL 6, affine parameters for each local area are learned corresponding to a variation attribute for a particular face orientation. This embodiment can utilize such a technique.

The variation parameter estimated here serves as a reference variation parameter. In the registration process, the variation process is executed in each local area based on the reference variation parameter to generate the image of the varied local area pattern, and the registered feature vector is generated by using the image of the varied local area pattern.

In the evaluation process, the variation range is set by adding the variation value, described above in connection with the formula (7), to the reference variation parameter that has been determined based on the variation attribute. More specifically, assuming that the reference variation parameter is expressed by the formula (6), the variation range is provided by a plurality of affine parameters expressed in combinations of the variation values $\Delta a1$, $\Delta a2$, $\Delta a3$, $\Delta b1$, $\Delta b2$ and $\Delta b3$ in the following formula (9), which are each oscillated over a predetermined range at a predetermined width.

$$\begin{pmatrix} x' \\ y' \end{pmatrix} = \begin{bmatrix} a_1 + \Delta a_1 & a_3 + \Delta a_2 & a_3 + \Delta a_3 \\ b_1 + \Delta b_1 & b_2 + \Delta b_2 & b_3 + \Delta b_3 \end{bmatrix} \begin{pmatrix} x \\ y \\ 1 \end{pmatrix} \quad (9)$$

Thus, when the variation attribute of the face can be determined, satisfactory classification can be performed while the load required for generating the varied local area patterns is restricted, by setting only the vicinity of the variation parameter, which provides good matching with high possibility, to be the variation range.

It is needless to say that, as in the third embodiment, a similar technique to that in this embodiment can be applied to various variation processes utilizing not only the affine transformation, but also the bilinear transformation and so on. Further, while this embodiment has been described as executing plural variation processes for the variation parameters other than the reference variation parameter in the evaluation process, the plural variation processes may be executed in the registration process as in the third embodiment. In addition, it is possible to gradually restrict the variation range of the reference local area to be processed in a later stage, as in the fourth embodiment, based on the variation parameters for the reference local areas that have been already processed.

<Sixth Embodiment>

The present invention is not limited to the face recognition process, and it can be widely applied to other pattern classification processes. A sixth embodiment will be described below in connection with the case where the present invention is applied to a process of detecting, from an image, the position and the posture of a particular part that is a detection target.

Figure 29A:
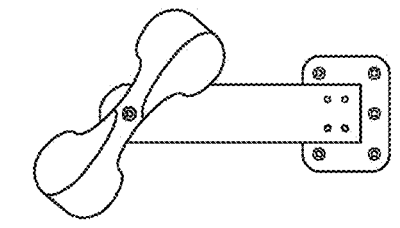
FIGS. 29A to 29F illustrate one example of parts detected by the part detection processing apparatus.
Figure 29B:
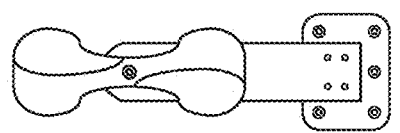
Figure 29C:
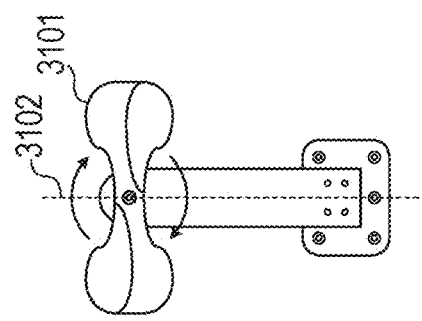

FIGS. 29A to 29F illustrate one example of a mechanical part that is a detection target of a pattern detection processing apparatus according to this embodiment. The mechanical part is constituted by a rotationally varying portion 3101 and an additional non-varying portion. Because the rotationally varying portion 3101 is freely rotated, the appearance of the mechanical part varies as illustrated in FIG. 29A and further as illustrated in FIGS. 29B and 29C, for example.

Figure 27:
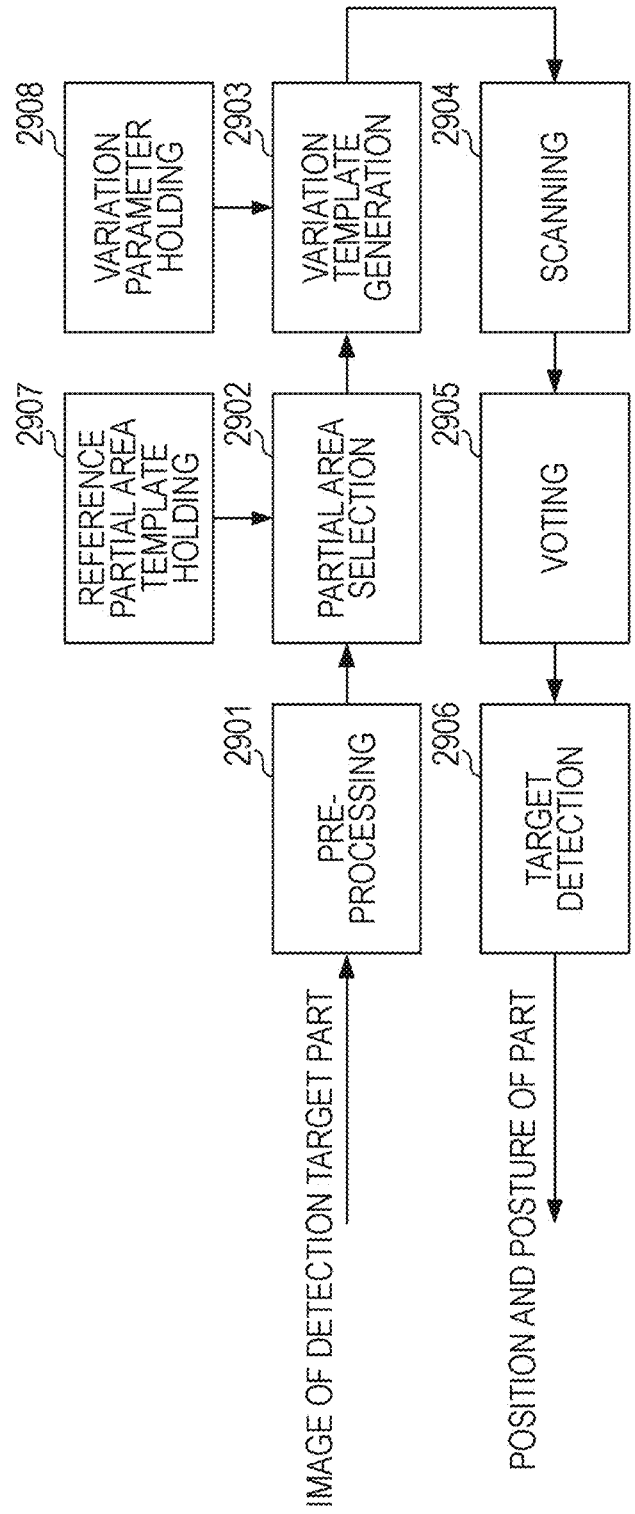
FIG. 27 is a block diagram illustrating an example of functional configuration of a part detection processing apparatus.

FIG. 27 illustrates the configuration of the pattern detection processing apparatus according to this embodiment. In the drawing, numeral 2901 denotes a pre-processing portion, 2902 denotes a partial area selecting portion, 2903 denotes a variation template generating portion, 2904 denotes a scanning portion, 2905 denotes a voting portion, and 2906 denotes a target detecting portion. Further, numeral 2907 denotes a reference template holding portion, and 2908 denotes a variation parameter holding portion.

The pre-processing portion 2901 processes the input image into a state suitable for a subsequent matching process with respect to a template. For example, an edge extraction process using filter arithmetic is executed herein.

The partial area selecting portion 2902 selects one of a plurality of partial areas set on the part, i.e., the detection target, and then selects and sets a reference partial area template that is held in the reference partial area template holding portion 2907 and that corresponds to the selected partial area. Here, the term "reference partial area template" implies a template for detecting a reference local area pattern, i.e., an image pattern of a predetermined local area of the detection target. Prior to the detection process, such a template is previously cut out from the part image used for registration and is stored in the reference partial area template holding portion 2907 (i.e., the reference partial area template holding means).

The variation template generating portion 2903 generates a plurality of variation templates based on a predetermined variation range when the selected reference partial area template corresponds to the varying portion of the detection target part.

The scanning portion 2904 serves as a local area detecting portion. More specifically, the scanning portion 2904 scans a sub-window having the same size as the variation template with respect to the processing target image, and when an image pattern matching with the variation template is detected, it outputs the position of the detected image pattern.

The voting portion 2905 has a voting plane therein corresponding to each posture of the part and gives a vote to a position on the voting plane, which corresponds to a relative center position of the part, based on position information matching with the variation template that has been obtained by the scanning portion 2904. In other words, the voting plane corresponding to each posture provides a two-dimensional histogram corresponding to an entire area of the input image.

The target detecting portion 2906 searches for one of the histogram bins on the voting plane, which is not less than a threshold, and detects that the detection target part in the corresponding posture is present at the position on the input image, which corresponds to the relevant bin.

Figure 28:
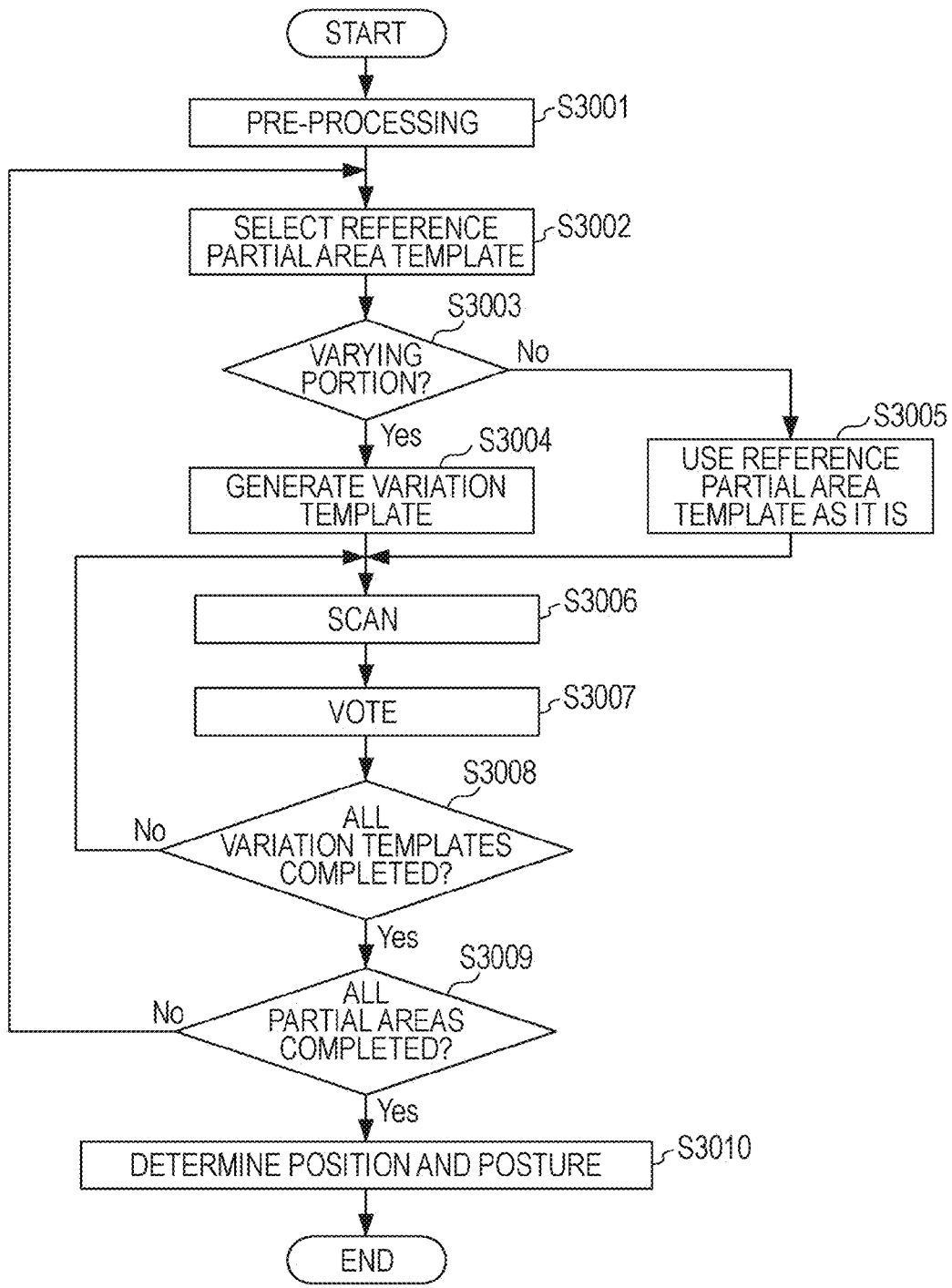
FIG. 28 is a flowchart illustrating one example of a detection process in the part detection processing apparatus.

Subsequently, the operation in a part detection process according to this embodiment will be described with reference to a flowchart of FIG. 28.

In step S3001, the input image is transformed by the pre-processing portion 2901 to the state adapted for the detection process. In this embodiment, because an edge image is used as the partial template of the target part, edge extraction is executed in this step. Subsequent processing is executed on an edge extraction image that has been transformed from the input image.

In step S3002, a partial area template selection process is executed by the partial area selecting portion 2902. First, one of a plurality of partial areas previously set corresponding to one portion of the detection target part is selected. The term "partial area" implies an area corresponding to a frame denoted by 3201 or 3202 in FIG. 29D, for example, and other partial areas are also present though not illustrated. Then, the reference partial area template corresponding to the selected partial area and held in the reference partial area template holding portion 2907 is selected and set. In this embodiment, the reference partial area template is an edge image.

Figure 29D:
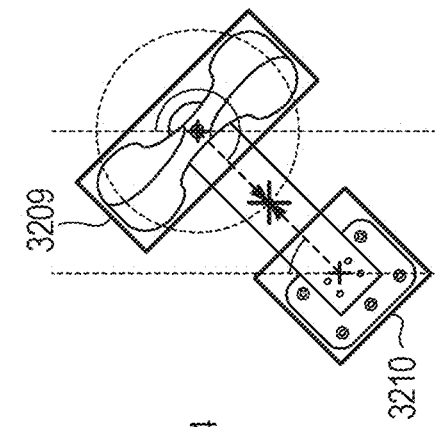
Figure 29E:
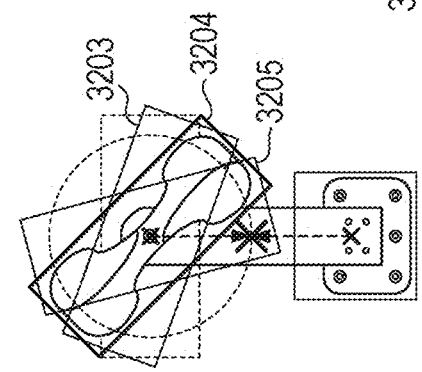

In next step S3003, it is determined whether the selected reference partial area represents the varying portion. In FIG. 29D, numeral 3201 denotes a portion subjected to rotational variation and hence a varying portion, and numeral 3202 denotes a portion not subjected to deformation (variation) and hence a not-varying portion. Information as to whether the partial area is the varying portion is held as an attribute for each partial area. If the selected reference partial area does not represent the varying portion, the processing is advanced to step S3005 and the selected reference partial area template is applied, as it is, to subsequent processing.

If the selected reference partial area represents the varying portion, the variation template is generated in step S3004 by the variation template generating portion 2903. The variation range corresponding to each partial area is determined by variation parameters held in the variation parameter holding portion 2908. In this step, plural templates are generated by applying, to the reference partial area template, the variation corresponding to each variation parameter and falling within the variation range. For example, because the area 3201 represents the rotating portion, plural variation templates are generated, as partially denoted by 3203, 3204 and 3205 in FIG. 29E, with a process of rotating the reference partial area template corresponding to 3201 a little by a little. Because the area 3201 is freely rotatable through 360° and is symmetric about an axis of rotation, the variation templates are generated, though not illustrated, over the range of 0° to 180° at intervals of a predetermined step.

In next step S3006, the variation templates are used one by one in turn to scan the pre-processed image that has been subjected to the pre-processing in step S3001, thereby determining the area matching with the variation template. That process is executed by the scanning portion 2904. In this embodiment, the template matching process is executed on the basis of the known technique using the Sum of Square Difference (SSD). However, a higher-performance pattern detector, such as the CNN described in the first embodiment, can also be of course used.

In step S3007, the voting portion 2905 gives a vote to the voting plane in accordance with the position matching with the reference partial area template or the variation template, which has been detected in step S3006. Here, the term "voting plane" is conceptually equivalent to a two-dimensional histogram having the same size as the input image. However, one pixel of the input image does not always correspond to one bin of the histogram, and an area of adjacent plural pixels (typically a rectangular area of a predetermined size) may be represented as one bin depending on the position accuracy required. Further, the voting plane is prepared in the same number as the number of part postures to be detected.

For example, the position of the voted bin relative to the voting plane for detecting the target part, which is in an upright posture (i.e., in a state where a center axis 3102 of the part extends in the vertical direction), is indicated by 3207 in FIG. 29D. In other words, numeral 3207 denotes a center position of the part, which is present at a location away upwards through a predetermined distance from a position 3206 matching with the reference partial area template 3202 when the part is in the upright posture. On the voting plane, an incrementing process is performed on the bin corresponding to the part center position 3207, which is located upwards relative to the partial area detected position 3206. An amount incremented at that time may be always set to 1 when the SSD value is not less than a predetermined threshold, or it may be set to a value depending on a differential value (i.e., on a degree of matching) in excess of the threshold. Further, instead of giving a vote to only one bin on the voting plane, a predetermined increment amount may be applied to a plurality of adjacent bins with a certain spread such as provided by the Gaussian distribution, for example.

The voting for the rotationally varying partial area 3201, which matches with any of the variation templates, is always given to the bin on the voting plane, which corresponds to the part center position 3207 located downwards through a predetermined distance from a center position 3208 of the rotation. As a result, a similar voting result is expected even when the partial area 3201 is matched with any of the variation templates 3204, 3205 and 3206 and other ones (not shown).

By thus concentrating voted locations to the part center position at the time of voting when each of the partial areas including the not-shown ones is matched, a value of the bin at the position where the part center is present increases to be able to detect the position of the part in each posture, which is present in the image.

In step S3008, it is determined whether the voting for all the variation templates with respect to the reference partial area (or for the reference partial area template in the case of the not-varying portion) is completed. If not yet completed, the processing for the remaining variation template is repeated from step S3006.

Then, in step S3009, it is determined whether the voting process for all the partial areas is completed. If not yet completed, the processing is repeated from step S3002.

In step S3010, the target detecting portion 2906 executes a position and posture determination process. More specifically, one of the histogram bins on each voting plane, which is not less than the threshold, is searched for to detect that the detection target part in the corresponding posture is present at the position on the input image, which corresponds to the relevant bin.

Figure 29F:
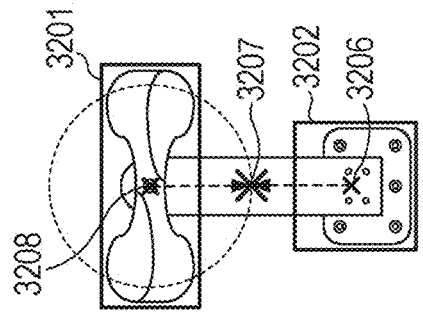

The result of the scanning using the variation templates can be utilized in common to a plurality of voting planes. FIG. 29F illustrates the voting onto the voting plane that corresponds to the part in the posture rotated 45° rightwards. The rotating portion represented by a partial area 3209 in FIG. 29F is oriented in the horizontal direction relative to the axis of the part, which is assumed to extend in the vertical direction (namely, the partial area 3209 is equivalent to 3201). However, exactly the same variation templates as those for the partial area 3205 in FIG. 29E can also be used for the partial area 3209. Thus, when the voting is performed based on the results of the scanning using the variation templates for the partial area 3205, the scanning process can be omitted by giving votes onto not only the voting planes corresponding to the upright posture, but also the voting planes corresponding to the posture rotated 45° rightwards.

The voting planes are prepared to be adapted for any postures covering 360°, and the rotating part can be oriented in any rotational detection. Therefore, the results of the scanning using all the variation templates in this embodiment can be used for voting onto all the voting planes. Of course, the relative position of the voted bin on the voting plane differs depending on the posture of the part. On the voting plane corresponding to the posture rotated 45° rightwards as illustrated in FIG. 29F, the voting is made onto the bin corresponding to the part center that is away through a predetermined distance in the direction of 225°.

For the not-varying portion such as represented by 3202, the result of the scanning using the reference partial area template is voted only onto the voting plane corresponding to a particular posture. The reference partial area corresponding to each posture can be generated from one reference partial area template. For example, the template corresponding to the partial area 3210 in FIG. 29F is generated by rotating the reference partial area template 45° rightwards, which corresponds to 3202 in FIG. 29D.

The variation templates for the varying portion and the reference partial area template corresponding to each posture may be previously generated in number required instead of generating those templates in the detection process. This speeds up the detection process in one hand, but greatly increases the amount of template data that has to be held.

[Example of Other Flexible Parts]

Figure 30A:
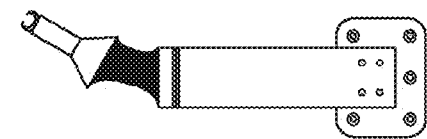
FIGS. 30A to 30F illustrate another example of parts detected by the part detection processing apparatus.
Figure 30B:
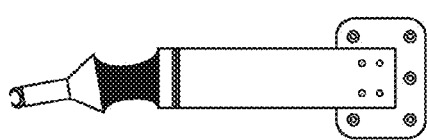
Figure 30C:
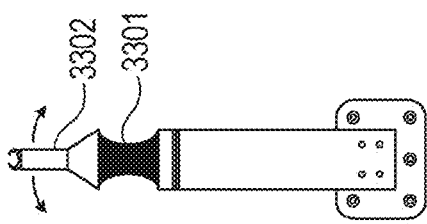
Figure 30D:
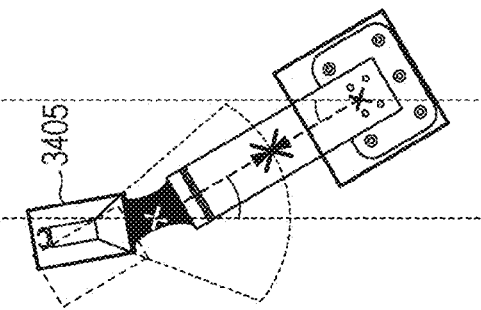

FIGS. 30A to 30F illustrate another part capable of being detected by the part detection processing apparatus according to this embodiment. The illustrated part has a structure that a varying portion 3302 is connected to a not-varying portion, which is similar to that of the part illustrated in FIG. 29, through a flexible portion 3301 made of rubber. The illustrated part takes a basic state of FIG. 30A, and it can be brought into states where the varying portion 3302 is oscillated leftwards and rightwards over a predetermined range as illustrated in FIGS. 30B and 30C. Unlike the part of FIG. 29, however, the varying portion 3302 is not rotated without limits.

Such a part can also be detected by the part detection processing apparatus according to this embodiment. A reference partial area template for the varying portion 3302 is provided corresponding to a partial area 3401 in FIG. 30D. The varying portion varies over the range of ±45° with a point 3402 being at a center of rotation.

The results of the scanning using various variation templates are voted onto the voting planes corresponding to a plurality of postures as in the case of the part illustrated in FIG. 29. However, because the variation range is limited, the voting is not made onto the voting planes corresponding to all the postures covering 360°. A circular arc 3403 represents the range of the voting planes onto which the scanning results for the template 3401 are voted. Thus, in the illustrated case, the voting is made onto the voting planes corresponding to all the postures in the range of ±45° with respect to the upright state.

Figure 30E:
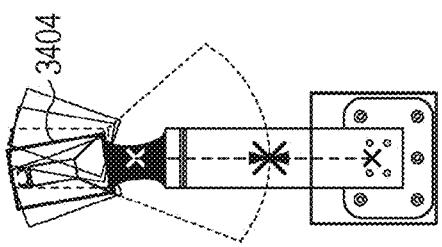

Further, FIG. 30E represents the upright part matching with the variation template corresponding to state where the varying portion is inclined about 10° leftwards. In that case, the range of the voting planes is provided by planes corresponding to the postures covering −10±45°, including the upright posture, and hence the part can be properly detected.

Figure 30F:
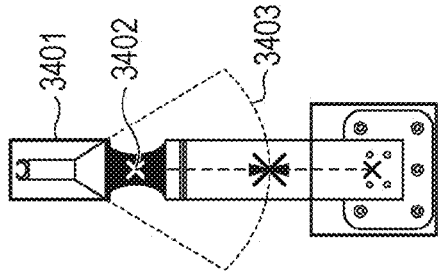

FIG. 30F illustrates the voting for the part in the posture inclined 30° leftwards. In the illustrated case, an angle of a varying portion 3405 is the same as that of a varying portion 3404 in FIG. 30E, and the results of the scanning using the same variation templates can be applied. As in the case of FIG. 30E, the voting plane corresponding to the posture of −30° is included in the range of −10±45°, including the upright posture, and hence the part can be properly detected.

According to this embodiment, as described above, even for the part including the varying portion, the position and the posture of the part present in the image can be specified substantially at the same accuracy as that for the part entirely constituted by the not-varying portion. While this embodiment has been described in connection with an example in which the detection process is executed based on the voting, the present invention can also be applied to other cases so long as the detection process is executed by utilizing the partial areas. Further, while this embodiment has been described as rotating the varying portion or rotating it within the limited range, the present invention is similarly applicable to the case where the varying portion is deformed in a way adaptable with the variation process, such as affine transformation, described in the first to third embodiment. In addition, while the description has been made only about the in-plane rotation of the posture to be detected for the sake of simplification, the present invention can also be applied to posture variations in the direction of depth as in the case of the face.

The objects of the present invention can also be achieved by supplying, to a system or an apparatus, a computer-readable storage medium on which software program code for realizing the functions of at least one of the above-described embodiments is recorded. In such a case, those functions are realized with a computer (CPU or MPU) in the system or the apparatus by reading and executing the program code stored in the storage medium. Thus, in that case, the storage medium storing the program code constitutes the present invention.

With the present invention, degradation in recognition accuracy can be suppressed even when an error is caused in the detection of the feature point and even when the shape of the local area is deformed due to variations in face orientation and expressions.

Further, with the present invention, a good detection result can be obtained even when the shape of a part of the target object varies.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A pattern processing apparatus for comparing an input pattern and a registered pattern in respective local areas, thereby determining a class to which the input pattern belongs, the pattern processing apparatus comprising:
   a memory; and
   a processor in communication with the memory, the processor configured to provide;
   a local area setting unit configured to set the local areas in the input pattern and the registered pattern;
   a varied local area generating unit configured to generate a plurality of varied local area patterns based on the local area set in at least one of the input pattern and the registered pattern;
   a similarity calculating unit configured to calculate a plurality of similarities for combinations of a pattern of the local area set in the input pattern or the plurality of varied local area patterns generated based on the input-pattern local area and a pattern of the local area set in the registered pattern or the plurality of varied local area patterns generated based on the registered-pattern local area, the local area in the registered pattern corresponding to the local area in the input pattern;

a representative similarity calculating unit configured to calculate, per local area, representative similarity in terms of similarity of the local area set in the registered pattern with respect to the local area in the input pattern from among the plurality of similarities for the combinations of the pattern of the local area set in the input pattern or the plurality of varied local area patterns generated based on the input-pattern local area and the pattern of the local area set in the registered pattern or the plurality of varied local area patterns generated based on the registered-pattern local area; and a classifying unit configured to classify, based on the representative similarity calculated by the representative similarity calculating unit, a class to which the input pattern belongs.

2. The pattern processing apparatus according to claim 1, wherein the varied local area generating unit generates the plurality of varied local area patterns by cutting out patterns from positions to which a position of the local area is moved within a predetermined search range.

3. The pattern processing apparatus according to claim 1, wherein the varied local area generating unit generates the plurality of varied local area patterns through a process of rotating a pattern near the local area to a plurality of angles.

4. The pattern processing apparatus according to claim 1, wherein the varied local area generating unit generates the plurality of varied local area patterns through a process of zooming a pattern near the local area at a plurality of scaling factors.

5. The pattern processing apparatus according to claim 1, wherein the varied local area generating unit generates the plurality of varied local area patterns through a process of deforming a pattern near the local area in accordance with a plurality of variation parameters.

6. The pattern processing apparatus according to claim 2, further comprising a variation attribute determining unit configured to determine a variation attribute of the input pattern or the registered pattern, wherein a variation range for use in the varied local area generating unit is decided based on the variation attribute determined by the variation attribute determining unit.

7. The pattern processing apparatus according to claim 2, further comprising a feature point detecting unit configured to detect a pattern feature point, wherein the local area setting unit sets the local area based on a feature point detection result by the feature point detecting unit, and the varied local area generating unit decides a variation range based on both the feature point detection result by the feature point detecting unit and information regarding an estimated error in the feature point detection by the feature point detecting unit.

8. The pattern processing apparatus according to claim 7, wherein the information regarding the estimated error in the feature point detection is a distribution reflecting an existence probability distribution of the feature point, and the varied local area generating unit sets the variation range based on both the feature point detection result by the feature point detecting unit and an area regarding a point which is in the distribution reflecting the existence probability distribution of the feature point and which provides a value not less than a predetermined threshold.

9. The pattern processing apparatus according to claim 7, wherein the varied local area generating unit decides the variation range based on the information regarding the estimated error related to at least one of the input pattern and the registered pattern.

10. The pattern processing apparatus according to claim 7, wherein the varied local area generating unit sets the variation range to a preset value regardless of the input pattern and the registered pattern.

11. The pattern processing apparatus according to claim 7, wherein the varied local area generating unit sets the variation range per local area.

12. The pattern processing apparatus according to claim 1, wherein the representative similarity calculating unit calculates per local area, as the representative similarity, a maximum value among the plurality of similarities calculated for the plural combinations of the pattern of the local area set in the input pattern or the plurality of varied local area patterns generated based on the input-pattern local area and the pattern of the local area set in the registered pattern or the plurality of varied local area patterns generated based on the registered-pattern local area.

13. The pattern processing apparatus according to claim 1, wherein when the plurality of similarities calculated for the plural combinations of the pattern of the local area set in the input pattern or the plurality of varied local area patterns generated based on the input-pattern local area and the pattern of the local area set in the registered pattern or the plurality of varied local area patterns generated based on the registered-pattern local area include plural ones which are not less than a predetermined threshold, the representative similarity calculating unit calculates per local area, as the representative similarity, the similarity with respect to the varied local area pattern having minimum variation from the local area set by the local area setting unit.

14. A pattern processing method for comparing an input pattern and a registered pattern in respective local areas, thereby determining a class to which the input pattern belongs, the pattern processing method comprising:

a local area setting step of setting the local areas in the input pattern and the registered pattern;

a varied local area generating step of generating a plurality of varied local area patterns based on the local area set in at least one of the input pattern and the registered pattern;

a similarity calculating step of calculating a plurality of similarities for combinations of a pattern of the local area set in the input pattern or the plurality of varied local area patterns generated based on the input-pattern local area and a pattern of the local area set in the registered pattern or the plurality of varied local area patterns generated based on the registered-pattern local area, the local area in the registered pattern corresponding to the local area in the input pattern;

a representative similarity calculating step of calculating, per local area, representative similarity in terms of similarity of the local area set in the registered pattern with respect to the local area in the input pattern from among the plurality of similarities for the combinations of the pattern of the local area set in the input pattern or the plurality of varied local area patterns generated based on the input-pattern local area and the pattern of the local area set in the registered pattern or the plurality of varied local area patterns generated based on the registered-pattern local area; and a classifying step of determining, based on the representative similarity calculated in the representative similarity calculating step, a class to which the input pattern belongs.

15. A non-transitory computer-readable storage medium for storing a program causing a computer to execute the pattern processing method according to claim 14.

16. A pattern processing apparatus for determining a class to which an input pattern belongs, the pattern processing apparatus comprising:
   a memory; and
   a processor in communication with the memory, the processor configured to provide:
   a setting unit configured to set local areas in the input pattern and a plurality of registered patterns;
   a generation unit configured to generate a plurality of varied local area patterns by varying a local area set in the input pattern;
   a first calculation unit configured to calculate respective similarities for combinations of the plurality of varied local area patterns generated from the local area in the input pattern and a pattern of a local area set in each registered pattern, the local area set in the registered pattern corresponding to the local area in the input pattern;
   p a determination unit configured to determine a representative similarity between each local area in the input pattern and a corresponding local area in the registered pattern from the respective similarities for the combinations of the plurality of varied local area patterns and the pattern of the corresponding local area in the registered pattern;
   a second calculation unit configured to calculate a plurality of integrated representative similarities for the plurality of registered patterns from representative similarities for local areas in the registered patterns; and
   a classifying unit configured to determine, based on maximum one of the plurality of integrated representative similarities calculated for the plurality of registered patterns, a class to which the input pattern belongs.

17. The pattern processing apparatus according to claim 16, wherein the generation unit generates the plurality of varied local area patterns by cutting out patterns from positions to which a position of the local area is moved within a predetermined search range.

18. The pattern processing apparatus according to claim 17, further comprising a variation attribute determining unit configured to determine a variation attribute of the input pattern,
   wherein a variation range for use in the generation unit is decided based on the variation attribute determined by the variation attribute determining unit.

19. The pattern processing apparatus according to claim 17, further comprising a feature point detecting unit configured to detect a feature point from a pattern,
   wherein the setting unit sets the local area based on the feature point detected by the feature point detecting unit, and
   the generation unit decides a variation range based on both the feature point and an information regarding estimated error for detecting the feature point.

20. The pattern processing apparatus according to claim 19, wherein the information regarding the estimated error for detecting the feature point is a distribution reflecting an existence probability distribution of the feature point, and
   the generation unit sets the variation range based on both the feature point and an area regarding a point which is in the distribution reflecting the existence probability distribution of the feature point and which provides a value not less than a predetermined threshold.

21. The pattern processing apparatus according to claim 16, wherein the generation unit generates the plurality of varied local area patterns through a process of rotating a pattern near the local area to a plurality of angles.

22. The pattern processing apparatus according to claim 16, wherein the generation unit generates the plurality of varied local area patterns through a process of zooming a pattern near the local area at a plurality of scaling factors.

23. The pattern processing apparatus according to claim 16, wherein the generation unit generates the plurality of varied local area patterns through a process of deforming a pattern near the local area in accordance with a plurality of variation parameters.

24. The pattern processing apparatus according to claim 16, wherein the determination unit determines, as the representative similarity, a maximum value among the respective similarities for the combinations of the plurality of varied local area patterns and the pattern of the corresponding local area in the registered pattern.

25. The pattern processing apparatus according to claim 16, wherein when the respective similarities for the combinations of the plurality of varied local area patterns and the pattern of the corresponding local area in the registered pattern include plural ones which are not less than a predetermined threshold, the determination unit determines, as the representative similarity, the similarity with respect to the varied local area pattern having minimum variation from the local area.

26. A pattern processing method for determining a class to which the input pattern belongs, the pattern processing method comprising:
   setting local areas in the input pattern and a plurality of registered patterns; generating a plurality of varied local area patterns by varying a local area set in the input pattern;
   calculating respective similarities for combinations of the plurality of varied local area patterns generated from the local area in the input pattern and a pattern of a local area set in each registered pattern, the local area set in the registered pattern corresponding to the local area in the input pattern;
   determining a representative similarity between each local area in the input pattern and a corresponding local area in the registered pattern from the respective similarities for the combinations of the plurality of varied local area patterns and the pattern of the corresponding local area in the registered pattern;
   calculating a plurality of integrated representative similarities for the plurality of registered patterns from representative similarities for local areas in the registered patterns; and
   determining, based on maximum one of the plurality of integrated representative similarities calculated for the plurality of registered patterns, a class to which the input pattern belongs.

27. A non-transitory computer-readable storage medium for storing a program causing a computer to execute the pattern processing method according to claim 26.

28. A pattern processing apparatus for comparing an input pattern and a registered pattern in respective local areas, thereby determining a class to which the input pattern belongs, the pattern processing apparatus comprising:
- a memory; and
- a processor in communication with the memory, the processor configured to provide:
    - a local area setting unit configured to set a local area in the input pattern;
    - a varied local area generating unit configured to generate a plurality of varied local area patterns based on the local area set in the input pattern;
    - a similarity calculating unit configured to calculate a plurality of similarities for combinations of a pattern of the local area set in the input pattern or one of the plurality of varied local area patterns generated based on the local area and a pattern of a local area in the registered pattern, the local area in the registered pattern corresponding to the local area in the input pattern;
    - a representative similarity calculating unit configured to calculate, per local area, representative similarity in terms of similarity of the local area set in the registered pattern with respect to the local area in the input pattern from among the plurality of similarities for the combinations of the pattern of the local area in the input pattern or one of the plurality of varied local area patterns generated based on the local area in the input pattern and the pattern of the local area set in the registered pattern; and
    - a classifying unit configured to classify, based on the representative similarity calculated by the representative similarity calculating unit, a class to which the input pattern belongs.

29. The pattern processing apparatus according to claim 28, wherein the varied local area generating unit generates the plurality of varied local area patterns by cutting out patterns from positions to which a position of the local area is moved in the input pattern.

30. The pattern processing apparatus according to claim 28, further comprising a feature point detecting unit configured to detect a feature point from the input pattern,
    wherein the local area setting unit sets the local area based on the feature point detected by the feature point detecting unit.

31. The pattern processing apparatus according to claim 28, wherein the representative similarity calculating unit calculates per local area, as the representative similarity, a maximum value among the plurality of similarities calculated for the combinations of the pattern of the local area in the input pattern or one of the plurality of varied local area patterns generated based on the local area in the input pattern and the pattern of the local area set in the registered pattern.

32. A pattern processing method for comparing an input pattern and a registered pattern, thereby determining a class to which the input pattern belongs, the pattern processing method comprising:
- a local area setting step of setting a local area in the input pattern;
- a varied local area generating step of generating a plurality of varied local area patterns based on the local area set in the input pattern;
- a similarity calculating step of calculating a plurality of similarities for combinations of a pattern of the local area set in the input pattern or one of the plurality of varied local area patterns generated based on the local area and a pattern of a local area in the registered pattern, the local area in the registered pattern corresponding to the local area in the input pattern;
- a representative similarity calculating step of calculating, per local area, representative similarity in terms of similarity of the local area set in the registered pattern with respect to the local area in the input pattern from among the plurality of similarities for the combinations of the pattern of the local area in the input pattern or one of the plurality of varied local area patterns generated based on the local area in the input pattern and the pattern of the local area set in the registered pattern; and
- a classifying step of determining, based on the representative similarity calculated in the representative similarity calculating step, a class to which the input pattern belongs.

33. A non-transitory computer-readable storage medium for storing a program causing a computer to execute the pattern processing method according to claim 32.

* * * * *